US012670530B2

(12) United States Patent
      Raich et al.

(10) Patent No.: US 12,670,530 B2
(45) Date of Patent: Jun. 30, 2026

(54) DIGITAL SYSTEM COMPRISING FINITE STATE MACHINE ENGINES FOR AUTOMATED PROCESSING OF FLEXIBLE CONFIGURABLE INDIVIDUAL POLICIES SEGMENTED BY LIFE-CYCLE STATES, INTER ALIA, USING A SLICED ADMISSION CONTROL TRIGGERED BY UNSCHEDULED SUM COVER INCREASE, AND METHOD THEREOF

(71) Applicant: Swiss Reinsurance Company Ltd., Zürich (CH)

(72) Inventors: Alexander Raich, Zürich (CH); Jörg Aulich, Zürich (CH); Lars Tackmann, Zürich (CH)

(73) Assignee: Swiss Reinsurance Company Ltd., Zürich (CH)

( * ) Notice: Subject to any disclaimer, the term of this patent is extended or adjusted under 35 U.S.C. 154(b) by 0 days.

(21) Appl. No.: 18/415,346

(22) Filed: Jan. 17, 2024

(65) Prior Publication Data

US 2024/0265463 A1      Aug. 8, 2024

Related U.S. Application Data

(63) Continuation of application No. PCT/EP2023/070069, filed on Jul. 19, 2023.

(30) Foreign Application Priority Data

Jul. 19, 2022     (CH) ............................... 000854/2022

(51) Int. Cl.
      *G06Q 40/08*          (2012.01)
      *G06F 30/23*          (2020.01)
                (Continued)

(52) U.S. Cl.
      CPC ............. *G06Q 40/08* (2013.01); *G06F 30/23* (2020.01); *G06Q 10/067* (2013.01); *G06Q 30/0206* (2013.01); *G06Q 40/02* (2013.01)

(58) Field of Classification Search
      CPC ....................................................... G06Q 40/08
      See application file for complete search history.

(56) References Cited

U.S. PATENT DOCUMENTS

2017/0372442 A1* 12/2017 Mejias .................. G16H 40/20

* cited by examiner

*Primary Examiner* — Edward Chang
(74) *Attorney, Agent, or Firm* — Oblon, McClelland, Maier & Neustadt, L.L.P.

(57) ABSTRACT

Proposed is a digital finite state system and platform and corresponding method thereof, for processing a digital object by object-state triggered processes. The object being capturable by a digital set of defined parameter values comprising at least structural parameter values or state parameter values associated with the object, wherein the digital set of defined parameter values define an initial state and/or set-up of the object, wherein the object is automatedly processed by the digital systems by processing the digital object by a sequence of process steps through which the digital object passes from an initial state to a final state. The digital system comprises a finite state machine engine, wherein the processing of each digital object is based on a finite state automaton comprised in or associated with the digital object, the finite state automaton comprising all possible states and associated transition rules for the digital object, the transition rules at least comprising the process steps and condition parameter values for the digital object to be processed form one finite state to a next finite state by the finite state machine engine. The possible states and their transition rules for the digital object are configurable within the digital object and are implicitly processed as part of an initial digital object configuration process, wherein the ini- (Continued)

tial state and/or set-up of the object at least comprise the possible states and associated transition rules as digital object configuration.

33 Claims, 30 Drawing Sheets

(51) Int. Cl.

| | | |
|---|---|---|
| *G06Q 10/067* | (2023.01) | |
| *G06Q 30/0201* | (2023.01) | |
| *G06Q 40/02* | (2023.01) | |

| Diving benefit Sum assured increase | 1 | 2 | 3 | 4 | 5 | 6 | 7 | 8 | 9 | 10 | 11 | 12 |
|---|---|---|---|---|---|---|---|---|---|---|---|---|
| 100000 | | | | | | | | | | | | |
| 95000 | | | | | | | | | | | | |
| 90000 | | | | | | | | | | | | |
| 85000 | | | | | | | | | | | | |
| 80000 | | | | | | | | | | | | |
| 75000 | | | | | | | | | | | | |
| 70000 | | | | | | | | | | | | |
| 65000 | | | | | | | | | | | | |
| 60000 | | | | | | | | | | | | |
| 55000 | | | | | | | | | | | | |
| 50000 | | | | | | | | | | | | |
| 45000 | | | | | | | | | | | | |
| 40000 | | | | | | | | | | | | |
| 35000 | | | | | | | | | | | | |
| 30000 | | | | | | | | | | | | |
| 25000 | | | | | | | | | | | | |
| 20000 | | | | | | | | | | | | |
| 15000 | | | | | | | | | | | | |
| 10000 | | | | | | | | | | | | |
| 5000 | | | | | | | | | | | | |

Fig. 6 cont.

| Driving benefit Term increase | 1 | 2 | 3 | 4 | 5 | 6 | 7 | 8 | 9 | 10 | 11 | 12 |
|---|---|---|---|---|---|---|---|---|---|---|---|---|
| 100000 | | | | | | | | | | | | |
| 95000 | | | | | | | | | | | | |
| 90000 | | | | | | | | | | | | |
| 85000 | | | | | | | | | | | | |
| 80000 | | | | | | | | | | | | |
| 75000 | | | | | | | | | | | | |
| 70000 | | | | | | | | | | | | |
| 65000 | | | | | | | | | | | | |
| 60000 | | | | | | | | | | | | |
| 55000 | | | | | | | | | | | | |
| 50000 | | | | | | | | | | | | |
| 45000 | | | | | | | | | | | | |
| 40000 | | | | | | | | | | | | |
| 35000 | | | | | | | | | | | | |
| 30000 | | | | | | | | | | | | |
| 25000 | | | | | | | | | | | | |
| 20000 | | | | | | | | | | | | |
| 15000 | | | | | | | | | | | | |
| 10000 | | | | | | | | | | | | |
| 5000 | | | | | | | | | | | | |

Figure 9:
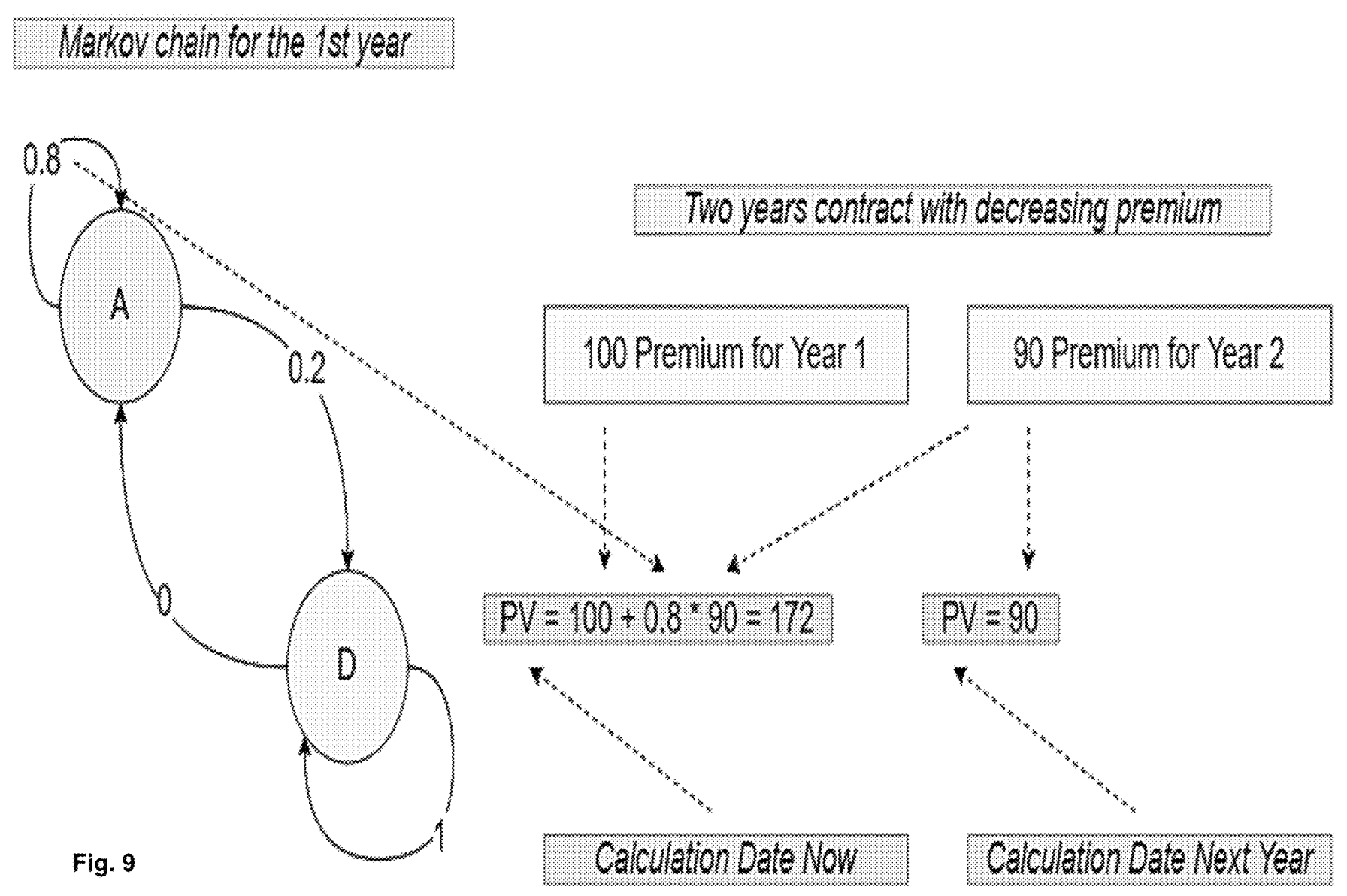

Two years contract with decreasing premium

90 Premium for Year 2

100 Premium for Year 1

PV = 90

PV = 100 + 0.8 * 90 = 172

Calculation Date Next Year

Calculation Date Now

Markov chain for the 1st year 0.2

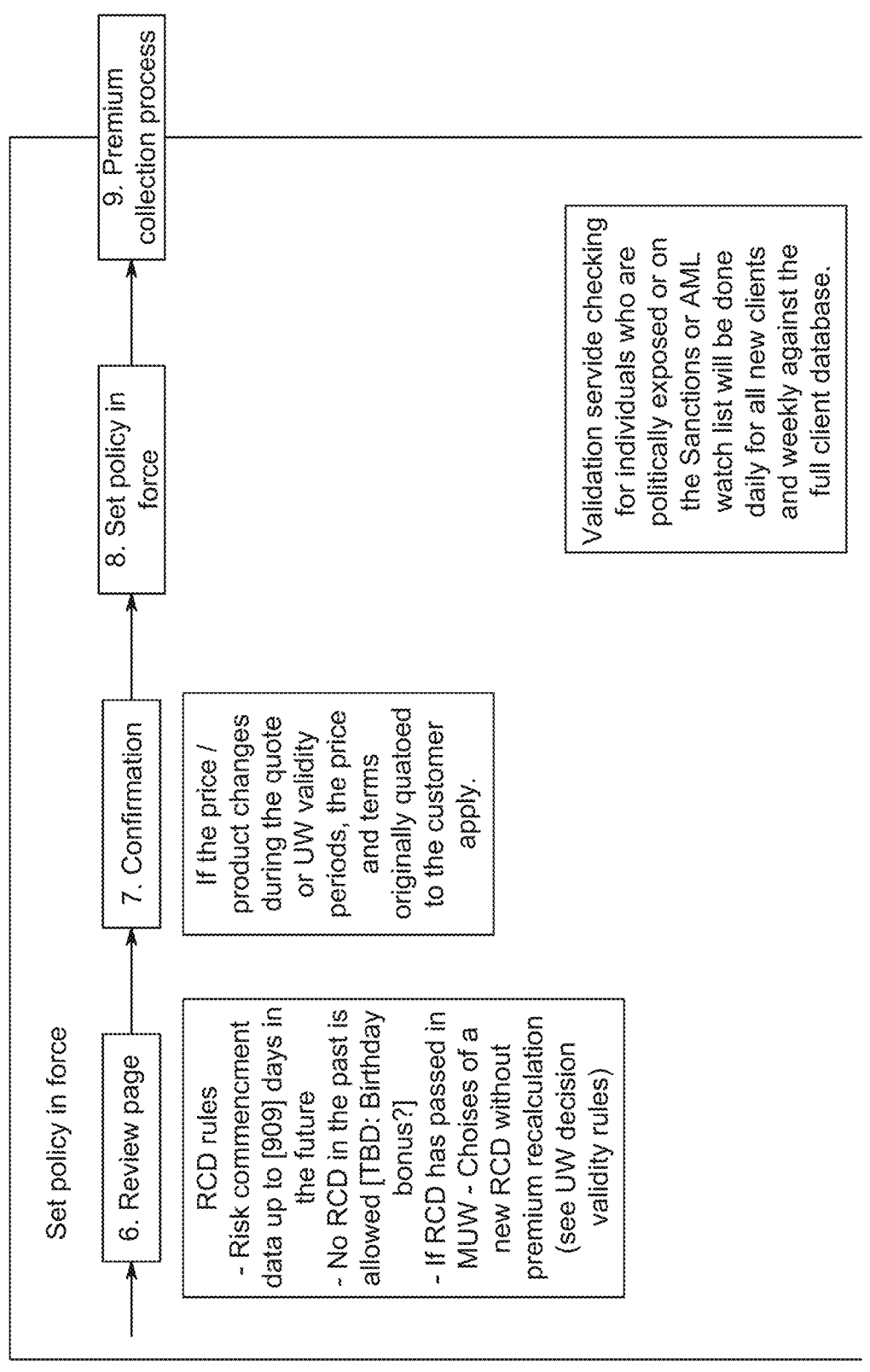

Set policy in force

9. Premium collection process

8. Set policy in force

7. Confirmation

If the price / product changes during the quote or UW validity periods, the price and terms originally quatoed to the customer apply.

6. Review page

RCD rules
- Risk commencment data up to [909] days in the future
- No RCD in the past is allowed [TBD: Birthday bonus?]
- If RCD has passed in MUW - Choises of a new RCD without premium recalculation (see UW decision validity rules)

Validation servide checking for individuals who are politically exposed or on the Sanctions or AML watch list will be done daily for all new clients and weekly against the full client database.

Fig. 18 (Cont'd)

DIGITAL SYSTEM COMPRISING FINITE STATE MACHINE ENGINES FOR AUTOMATED PROCESSING OF FLEXIBLE CONFIGURABLE INDIVIDUAL POLICIES SEGMENTED BY LIFE-CYCLE STATES, INTER ALIA, USING A SLICED ADMISSION CONTROL TRIGGERED BY UNSCHEDULED SUM COVER INCREASE, AND METHOD THEREOF

CROSS REFERENCE TO RELATED APPLICATIONS

The present application is a continuation application of International Patent Application No. PCT/EP2023/070069, filed Jul. 19, 2023, which is based upon and claims the benefits of priority to Swiss Application No. 000854/2022, filed Jul. 19, 2022. The entire contents of all of the above applications are incorporated herein by reference.

FIELD OF THE INVENTION

The present invention relates to digital system processing an object by object-state triggered processes, the object being capturable by a set of parameters, as structural and/or state and/or other measuring parameters associated with the object, the set of parameters defining an initial state and set-up of the object. Inter alia, the object and the set of parameters can e.g. refer to policies. In particular, it relates to automated processing systems for processing or manufacturing an object or piece of work by a sequence of technical or industrial or other processes through which the object or piece of work passes from initial to a final state, as e.g. completion, and where the processing is based on a finite state machine and finite state automaton.

BACKGROUND OF THE INVENTION

Traditionally, to process an object or piece of work through a sequence of industrial, technical, or other processes through which the object or piece of work passes from initiation to a final state, e.g. completion, a so called workflow is used, which is a system for steering, signaling, and operating repetitive processes and tasks which occur in a particular order. Workflow processing is widely used for automation of processes in industry and technology. Workflow denotes the technical mechanisms and sequence of operations or processing steps by which a machine or process accomplish their work on an object or piece of work, whether manufacturing a product, processing information or any other technical activity. The object in the workflow can be any kind of object or product to be manufactured or processed, as for example also a digital object, as a digital image within a pattern recognition process or image enhancement process or a defined set of selected parameters, as e.g. measuring parameters and structural parameters of a physical real-world object or a digital replica of a real-world object or its state. In special cases, such a set of parameter values is called a policy inter alia capturing physical parameters of the object and its physical interaction with the environment given e.g. by its object-specific exposure measures to occurring physical real-world events physically impacting the object.

Characteristic for a workflow system is, that the operation or processing steps are induced, signaled and/or triggered, i.e. orchestrated, from external. As such, the object or piece of work is processed through the sequence of processing steps. Technically, a workflow consists of orchestrated and repeatable processing steps or pattern of activity, enabled by a systematic application of resources into processes that transform the object, piece of work or materials, or process the digital data. It can be depicted as a sequence of operations or processing steps of a processing system comprising one or more simple or complex mechanisms and processing steps. This sequence technically provides the basis for the automation. In this context, it has to be noted, that the term "process", as used in the technical field is a more general notion than workflow and can apply to, for example, physical or biological processes, whereas a workflow is typically a technical process or collection of process steps described in the context of processing of an object or piece of work, such as all processes occurring in a machine or automated system environment. An important technical concept in the technical field of workflow systems is the so called "flow control". Flow control is a technical control concept applied to steer and signal the workflows, to distinguish from static control of buffers of material or steering signaling and steering commands, to denote a more dynamic control of flow speed and flow volumes in motion and in the sequence of process steps. Such orientation to dynamic aspects is the basic foundation to prepare for more advanced process controls, such as just-in-time signaling or just-in-sequence signaling of operational units processing the object or piece of work form one workflow state to the next workflow state. In the present context, it is to be noted that also automated risk-transfer claims processing is an example of a data-intensive, parameter-driven digital workflow based on parameter values' sets defined by policies which inter alia sets the parameter values for triggering loss covers due to physical impacts to an exposed object as well as the resource transfer for receiving the loss cover, which is typically related to a predicted exposure (i.e. risk) measure for a defined future time window.

However, it is a technical problem, that for all prior art systems it is characteristic, that the operation or processing steps technically needs to be induced, signaled and/or triggered, i.e. orchestrated, from external, i.e. by an external signaling and/or steering systems. This does not allow for an individual, in particular individually adapted processing of the piece of work or object, where the adaption can e.g. be related to characteristics of the object, characteristics of its interaction with the environment (as e.g. its exposure to external impacts), or geographically dependent characteristics etc. etc.

Another technical problem is related to the automation and digital data processing of loss impact measures and prediction or simulation. In traditional life risk-transfer industry and technology, a finite-state Markov chain is often used as technical structure to capture and parametrize, i.e. to represent different state of the insured during data processing. Associating monetary amount vales with sojourn times in states and transitions between states allows to generate and forecast a present value for life risk-transfer losses to be expected within an associated error margin at a set interest rate value. Traditionally these model structures have been used with deterministic interest rate parameter settings and deterministic transition rate parameter settings, however in recent life risk-transfer forecast modelling and simulations, stochastic modelling structures of the interest parameters and transition rate parameters has gained attention in automation and data processing. This is of particular technical interest either if the risk (herein understood as the technical value of the forecasted frequency and aggregated event strength (actually occurring event loss) within a future measuring time window) associated with changes in the underlying interest parametrization and transition rate parameters is to be captured and forecasted, and/or if one wants to hedge this forecasted risk by building up balancing securities based on these same underlying rate parameter settings. A technical life risk-transfer setup with stochastic transition rate settings is, where the underlying rate parameters are processed and captured by a finite-state Markov chain model structure and, in particular, dependence between the rate parameters is enabled within the structure. In the prior art systems, there are various technical data processing treatment of stochastic interest rates applied in life risk-transfer modelling and for forecasting stochastic mortality rate parameter values. Also combined model structures for stochastic interest and mortality rate parameters settings are known. Common to several of the prior art systems is that interest and mortality rate parameters are technically propagated and thus modelled by engineering model structures representing affine model processes for the data processing. This class of processes leads to technically tractable modelling and forecasts, where the core of the data processing is reduced to solve a system of ordinary differential equations instead of partial differential equations in order to find expected present values, which is of great technical advantage for data processing by finite state machines being based on finite state processors. The present invention technically allows for the application of affine processes in more general life risk-transfer modelling structures, thus making it easier and technically more efficient to forecast by data propagation and simulation expected present values.

It is known in the prior art systems, that finite-state Markov chain structures can be applied for data propagation in modelling risk-transfer and appropriate pricing parameters for a specific risk-transfer but can also be applied for forecasting of credit risks. Credit risk is defined herein as the actual and/or expected degree of value fluctuations in debt instruments and derivative structures due to measured changes in the underlying credit quality of associated counterparties or counter units. While vector autoregression (VaR) model structure applied to daily market risk calculations is able to generate about 250 forecast in one year, credit risk model structures technically are limited to about one forecast per year due to their tail structure. Thus, it would take a very long time to produce sufficient observation measurements for reasonable tests and weighting of forecast accuracy for these data processing structures. In addition, due to the nature of credit risk measurements, only a limited amount of historical data on credit losses can be assessed which is not enough to span several macroeconomic or credit cycle processing. These data limitations create a serious technical difficulty for the validation and calibration of credit risk model structures. It is to be mentioned that vector autoregression model structures are statistical based structures used to capture and propagate the relationship between multiple quantities and measures as they change over time. Thus, all VAR structures are types of stochastic process modelling. VAR modelling technically generalize the single-variable (univariate) autoregressive modelling by allowing for capturing multivariate time series. Similar to the autoregressive model structures, each measured or captured variable has a relation (function or equation) modelling and propagating its evolution over time. This relation includes the variable's lagged(past) values, the lagged values of the other variables in the model structure, and an error term. VAR model structures have the advantage that they do not require as much information about the forces influencing a variable as do structural model structures based on simultaneous equations. The only information, technically required, is an appropriate filter for variables which can be hypothesized to affect each other over time.

Thus, a major technical impediment to model validation (so called "back testing"), not only for life-risk-transfer modelling but also for credit risks modelling, is the small number of forecasts available with which to calibrate a model's forecast processing accuracy. There is a need to provide a more flexible modelling and simulation structure which can be used to forecast and propagate the relevant parameter values reliably to a future time range. Also basic credit risk model structures can typically be captured by a two-state Markov chain, where a jump from the initial state represents a default. An extension of this model, known in the prior art, is to let the default transition rate be modelled as a stochastic process itself such that it is possible for it to be dependent on the interest rate and other economic factors. This approach can be applied to various Markov chain model structures. In a more general treatment of the Markov chain approach to credit risk modelling with stochastic transition rates it can be shown how prices generally satisfy a system of partial differential equations. In both approaches, it can be shown how one can benefit from affine stochastic processes as transition intensities and economic measuring factors. If the modelling structure is particularly simple, the Riccati relation can be used to reduce the modelling problem of solving a system of partial differential equations to that of solving a system of ordinary differential equations, which can have significant technical advantages in terms of data processing efficiency and used time. The technical approach of the present invention has, inter alia, the advantage, that it allows to generalize these prior art methods allowing for risk-transfer pricing in more general decrement Markov chain model structures. Therefore, while Markov Chain modelling structures are used widely in risk-transfer technology and industries, its combination with configuration elements according to the present invention allows a level of flexibility and dynamism. The present inventive system can, inter alia, be applied for doubly stochastic Markov chain structures, in particular in life risk-transfer and credit risk forecast and simulations. It can further be applied for the generation of transition probabilities in certain doubly stochastic Markov chains, wherein the resulting output-signaling can e.g. be used for valuation of life insurance contracts.

SUMMARY OF THE INVENTION

It is an object of the invention to provide more efficient and more accurate and more flexible systems and methods allowing a new, dynamic, and flexible adaptable processing and propagation of loss-cover related parameter sets, as e.g. life risk parameters with associated automated dynamic risk-transfer pricing and dynamic premiums generation and assessment for a policy capturing the individual risk-transfer settings and parameter values. It is further an object of the present invention to allow for using for the processing of the flexible policies, finite state machine engines as technical structure in place of the traditional static and external orchestrated workflow systems for the automated process of the objects.

According to the present invention, these objects are achieved particularly through the features of the independent claims. In addition, further advantageous embodiments follow from the dependent claims and the description.

According to the present invention, the abovementioned objects are particularly achieved by the digital finite state system for processing a digital object by object-state triggered processes, the object being capturable by a digital set of defined parameter values comprising at least structural parameter values or state parameter values associated with the object, wherein the digital set of defined parameter values define an initial state and/or set-up of the object, wherein the object is automatedly processed by the digital systems by processing the digital object by a sequence of process steps through which the digital object passes from an initial state to a final state, in that the digital system comprises a finite state machine engine, wherein the processing of each digital object is based on a finite state automaton comprised in or associated with the digital object, the finite state automaton comprising all possible states and associated transition rules for the digital object, the transition rules at least comprising the process steps and condition parameter values for the digital object to be processed form one finite state to a next finite state by the finite state machine engine, and in that the possible states and their transition rules for the digital object are configurable within the digital object, and are implicitly processed as part of an initial digital object configuration process, wherein the initial state and/or set-up of the object at least comprise the possible states and associated transition rules as digital object configuration. The digital set of defined parameter values can e.g. be given by digital policy parameter values of a policy for a loss-cover related to an exposure of a risk-exposed unit in case of the occurrence of a defined physically impacting event, the set digital policy parameters of the policy representing the set of parameters of the digital object, wherein the processing states are given by the policy lifecycle states. The transition rules can e.g. at least comprise automated transition triggers and/or transition threshold values and transition processes comprising at least connect and/or forge and/or junction processes. Further, the automated transition triggers can e.g. trigger transitions automatically or by default, wherein an automatic transition is triggered when at least one trigger value or threshold value is detected by the digital system to be reached or exceeded. The at least one trigger value or threshold value can e.g. be continuously or periodically monitored by the finite state machine engine, wherein if a parameter value associated with the digital object is reached or exceeded, the trigger triggers the state transition.

The digital system can e.g. comprise a calculation engine comprising a data structure for capturing and/or storing deterministic transition and interest rate parameter values of a state discrete process to conduct data processing per policy, wherein parts of the process are used with stochastic transition and interest rates of a discrete process for conducting simulations on portfolio level, wherein the digital system comprises an interface to the finite state machine engine, wherein for the digital object processing at least interest parameter values and/or transition rate parameter values are user-specific and flexible configurable and/or selectable from an associated digital library, wherein, within the finite state machine engine, setup parameters and stochastic transition rates are processed and modelled or simulated by the finite state machine engine, wherein the digital system comprises a slice generator, wherein data processing is sliced by taking place on a slice level and aggregated on a state of benefit and quote level, wherein a slice is created whenever a policy benefit is subject to an unscheduled sum assured increase, and wherein for each newly applied risk-transfer each benefit starts with one slice, each slice being related to the specific risk-transfer version, cover and tariff at that a respective point in time, the slice is generated for. Every finite state of a policy is made up of one or multiple benefit slices. The calculation engine processes the parameter values on a per slice basis and/or cycle, providing traceable pricing parameter values generation and outputs. The calculation engine can e.g. comprise an object or product framework setting a full set of allowable configuration options on product and/or benefit and/or tariff level, of which subsets can be used to configure an individual risk-transfer. The product or object framework further can e.g. comprise a product entity framework with an initial setting of the product framework comprises at least premium frequency yearly and monthly. The initial setting of the product framework can e.g. comprise at least premium frequency yearly and monthly, wherein the parameter values are enhanceable over time. The product framework can e.g. further comprise a benefit entity framework defining a full set of allowable configuration options on benefit level, of which subsets are useable by benefits. The product framework can e.g. further comprise a tariff entity framework defining a full set of allowable configuration options on tariff level, of which subsets are useable by tariffs. Adaptable premium rate tables can e.g. be located on tariff level in order to have the ability to always apply the latest premium rate tables per policy slice.

The technical approach of the present invention has, inter alia, the advantage, that it allows to process and manage all possible policy lifecycle states of the whole policy based on a finite state engine. With this technical approach, the possible states and their transition rules for a risk-transfer product are configurable in the object or product as such, where state transitions are not executed from an external instance like a workflow engine, but they are done implicitly as part of the product configuration. Traditionally the management of policy lifecycles in digital systems is done based on predefined workflows. The core concept behind this setup is the idea of a policy being a structure of data points and parameters without having any information or implicit logic about their own "behavior" but technically require to be externally orchestrated and modified by a workflow management system. In prior art systems, policy workflows are defined as sequences of connected steps, where each step follows a rule or pattern. Workflow management systems handle the routing of data (policies) between those steps, handle dependencies, and make sure tasks are done in the right order. In contrast to the prior art systems, the present inventive system allows to use an implicit object/product configuration approach and the choreography of the policy lifecycle is implicitly set by transition rules in the object/product which are then considered by a finite state engine to change policy states. This technical structure that captures an object to be processed, as e.g. a risk-transfer product, by a finite number of states, where a policy can only be in one state at a time. The policy transitions from one state to another in response to some external inputs like lifecycle events (e.g. customer buys, policy claimed, policy end date reached) and a set of configured transition rules. This makes the behavior of the policy implicit and allows for significant changes in the product lifecycle by simple configuration changes in the underlying transition rules. FIG. 1 shows exemplary state transitions of a policy with associated events. FIG. 2 shows an exemplary realization of an exemplary. inventive finite state transition engine with an actual transition example. This flexible adjustment of state transitions further has the advantage to allow for changing the behavior of policies for requirements of different jurisdictions. Those have typically different compliance demands, like the preconditions for a policy to go on risk (e.g. customer screening has been done, ID verification might be required pre-sales in Germany but not in UK). This behavior can be simply configured as transition rule without adjusting externally set workflows. This makes it easy to use the platform in a real multi-jurisdictional environment. The same applies also for setting up different process requirements for different tenants/carriers using the digital system or platform. As an example, one tenant might need to do certain data checks before a policy can go on risk whereas another tenant might not need it.

Further, the present invention has the advantage to allow maximum flexibility as user needs can change, every instance of a policy is made up of multiple benefit slice. The data processing system can calculate on a per slice basis, ensuring accurate and auditable automated pricing parameters generation and outputs. An even further advantage is that all calculation-relevant attributes can be located on tariff level to enhance flexibility to allow for different values per policy slice. For example, premium rate tables can e.g. be located on tariff level in order to have the ability to always apply the latest premium rate tables per policy slice. Another advantage is that data processing and/or calculation requests can be enhanced by configuration flexibility by atomizing the calculation request into micro calculation requests on quote, benefit and slice level, which are pre-processed and run in dynamic order, so that MTAs can be defined exclusively by pre-processing rules (and all of them use the same core-processing rules): (i) pre-processing i.e. creating the micro calc requests on quote, benefit and slice level and populate them, (ii) core-processing, i.e. executing the micro calc requests by using the core calculation, which always stays the same. It is a further advantage of the present invention, that it provides a technical framework which allows to place life and other contingencies within the same technical framework based on a general, unified, finite state processing for such concepts as actuarial value, prospective and retrospective premium reserve, etc., within said one technical framework. Though, the inventive system is not completely general in the sense that all (known) forms of life contingency insurance appear as special cases. Typically, the applicability of the system can be restricted to such cases as describable by finite-state time-continuous machine. However, the system is also able to generalize the technical approach to situations with a countable infinity of states. Thus e.g. cases with certain forms of select forces of transition can also be covered by the system, though these can require a different state space. In addition, the system is also applicable to cases where the benefit depends on duration in a state, as disability-triggered risk-transfer with a qualifying period. All known prior art systems are not applicable in this sense to capture such broad diverging cases, as the present invention does.

It is to be noted that a technical setup of generation of risk transfers and cashflows based on Markov-Chains in the platform can be realized flexibly as described also in the patent application, but this generation and assessments as such is in general stateless. What is being considered as part of the modelling approach is a certain state of a benefit and it's transition in the context of probabilities in the Markov Chain based assessment and generation but this applies to the risk as such and not to the policy lifecycle states (see FIG. 3).

BRIEF DESCRIPTION OF THE DRAWINGS

The present invention will be explained in more detail below relying on examples and with reference to these drawings in which:

FIGS. 5 to 7 show block diagrams illustrating schematically an exemplary overview of slices with FIG. 5 showing the color legend and FIG. 6 the according slice processing.

FIGS. 8 to 9 show block diagrams illustrating schematically an exemplary overview of how the Markov Chain modelling structure is used, where FIG. 8 shows a simple Markov Chain modelling example, and FIG. 9 a simple Markov Chain calculation for premium cashflow linked to state A. FIG. 9 shows an example for 1000 customers: 1st year, 100*1000=100,000 are received. If in 2nd year 20% are deceased, then the active customers are 800 and 90*800=72,000 are received (instead of 90*1000=90,000).

Stream parallelization in Calculator, (b) Returning already built CalculationElement in CalculationFactory+More implementations of CalculationElement, (c) coverTerm Years . . . , not having to calculate all the elements again (d) Enhance calculation request configuration flexibility by atomizing the calculation request into micro calculation requests on quote, benefit and slice level, which are pre-processed and run in dynamic order, so that MTAs can be defined exclusively by pre-processing rules (and all of them use the same core-processing rules): (i) pre-processing i.e. creating the micro calc requests on quote, benefit and slice level and populate them, (ii) core-processing, i.e. executing the micro calc requests by using the core calculation, which always stays the same.

Figure 16:
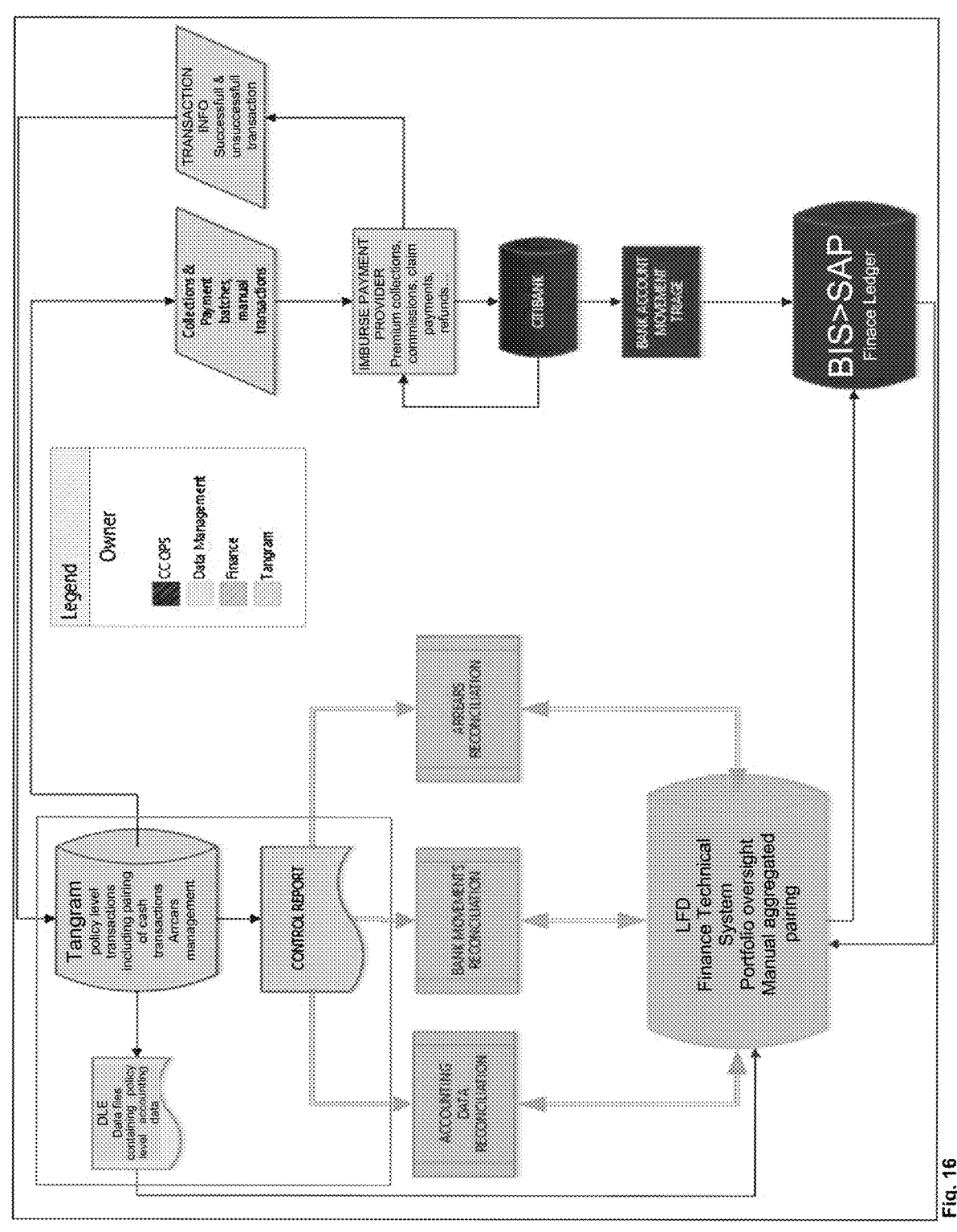

FIG. 16 shows block diagrams illustrating schematically an exemplary technical accounting (TA) structure by a process flow diagram of the solution. The goal of the technical accounting domain is to provide source accounting data in order to support ledger systems (LFD). The solution allows an event-based policy admin system to integrate with traditional RDBMS LFS platforms. Further it allows to provide outputs policy-level accounting data via both DLE & Control Report, allowing data to be cross-checked directly with the source system.

Figure 17:
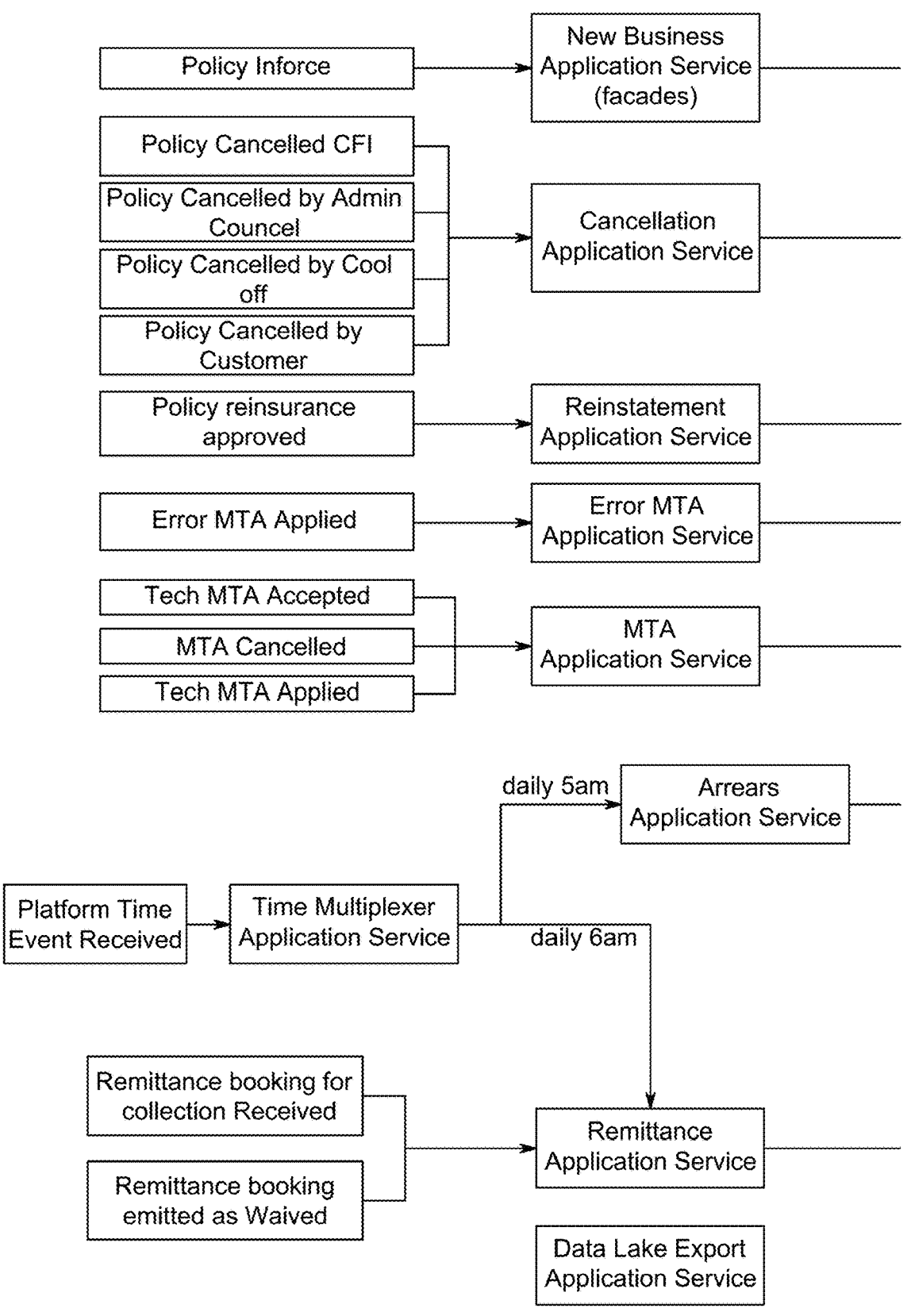

FIG. 17 shows block diagrams illustrating schematically an exemplary technical accounting (TA) structure. The embodiment variant uses (i) DDD (Domain Driven Design), (ii) CQRS (Command Query Responsibility Segregation) (iii) ES (Event Sourcing). It aggregates with ES: (a) Accounting Plan (b) Remittances, (c) Arrears. It aggregates without ES: (a) Quote. ES+CQRS is implemented with a lightweight framework. ES Events are internal, and are NOT events in Kafka topics, but events in an internal event store. Only belongs to the Technical Accounting service. The system uses Hexagonal architecture, the project can be split into modules by concerns. The Domain only knows about the interface of the persistent store but has no idea about the underlying storage/implementation.

Figure 18:
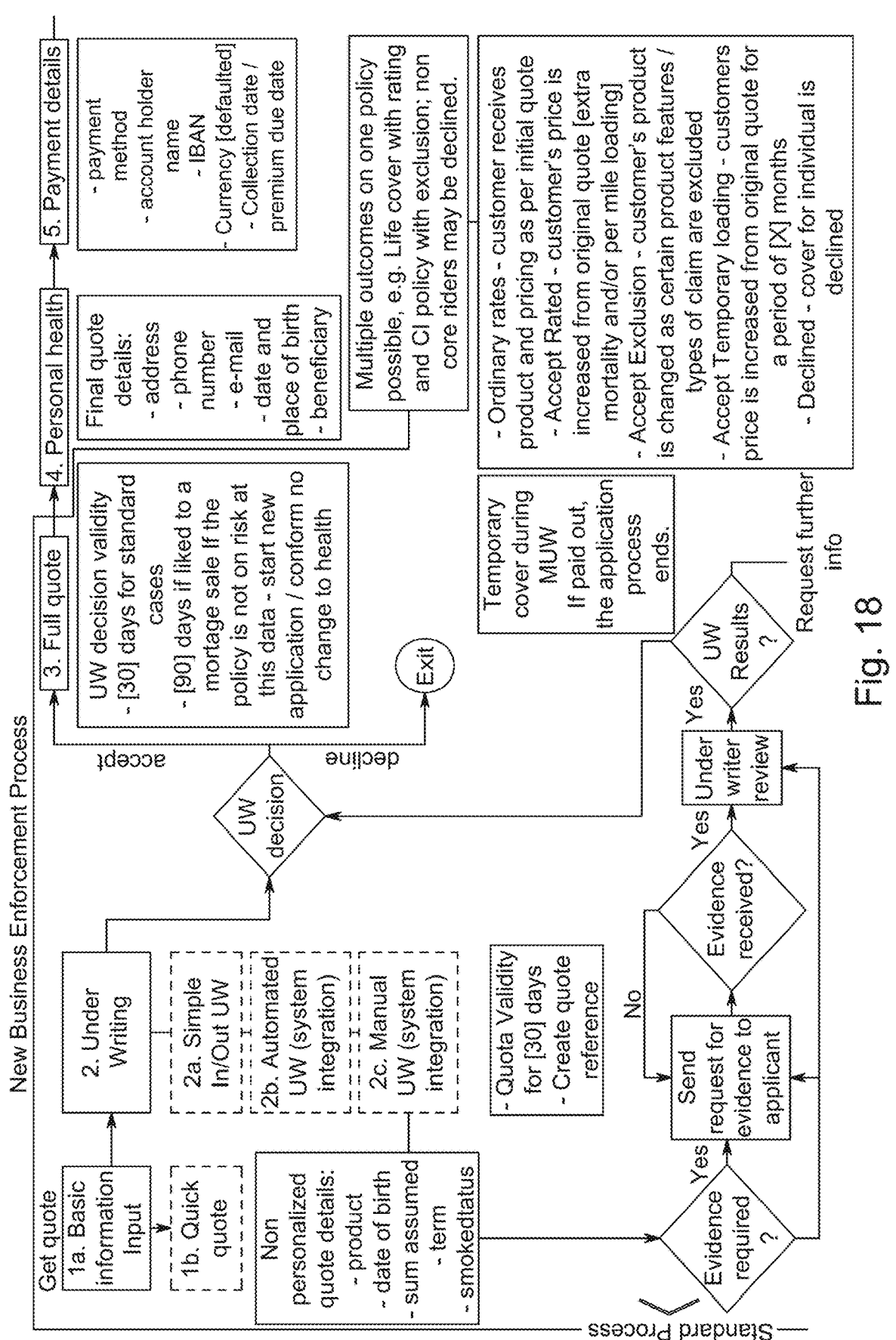

FIG. 18 shows block diagrams illustrating schematically an exemplary policy structure (refactored). The policy structure and service hold policy-related data and drives the policy lifecycle, listening to all other services and making sense of the policy/customer at any given point in time. It includes the third party service (i.e. customer/company data and their roles against individual policies). The embodiment variant e.g., comprises (i) The definable rules, behavior, and interaction of the 'Product/Calc' and 'Policy' services, as well as the operations and validations required to get take a policy into force, plus the associated benefits and riders—all of which is driven by configuration, (ii) Benefit slices—To allow maximum flexibility as customers' needs change, every instance of a policy is made up of multiple benefit slices. While slices exist in other systems, the inventive use and interact with them across the system to generate policy changes (Mid Term Adjustments) is not known in the prior art.

Figure 19:
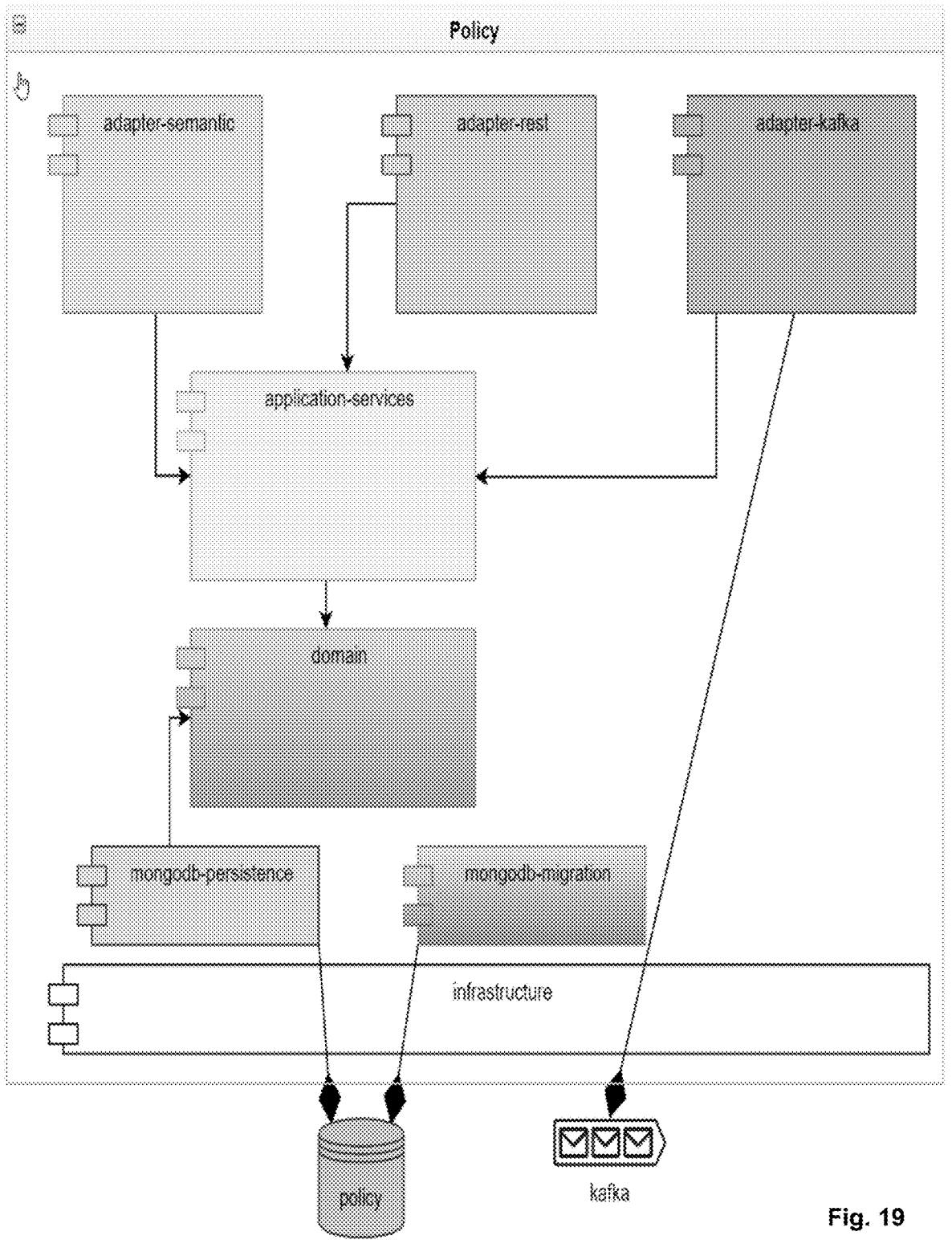

FIG. 19 shows block diagrams illustrating schematically an exemplary policy structure (refactored). Design principles of the refactored policy structure and service design can e.g. comprise (i) Isolate application and domain logic, (ii) Domain-driven-design, (iii) Improved REST API for policy management to follow the business processes, (iv) Evolving of the event schemas to simplify messaging.

Figure 20:
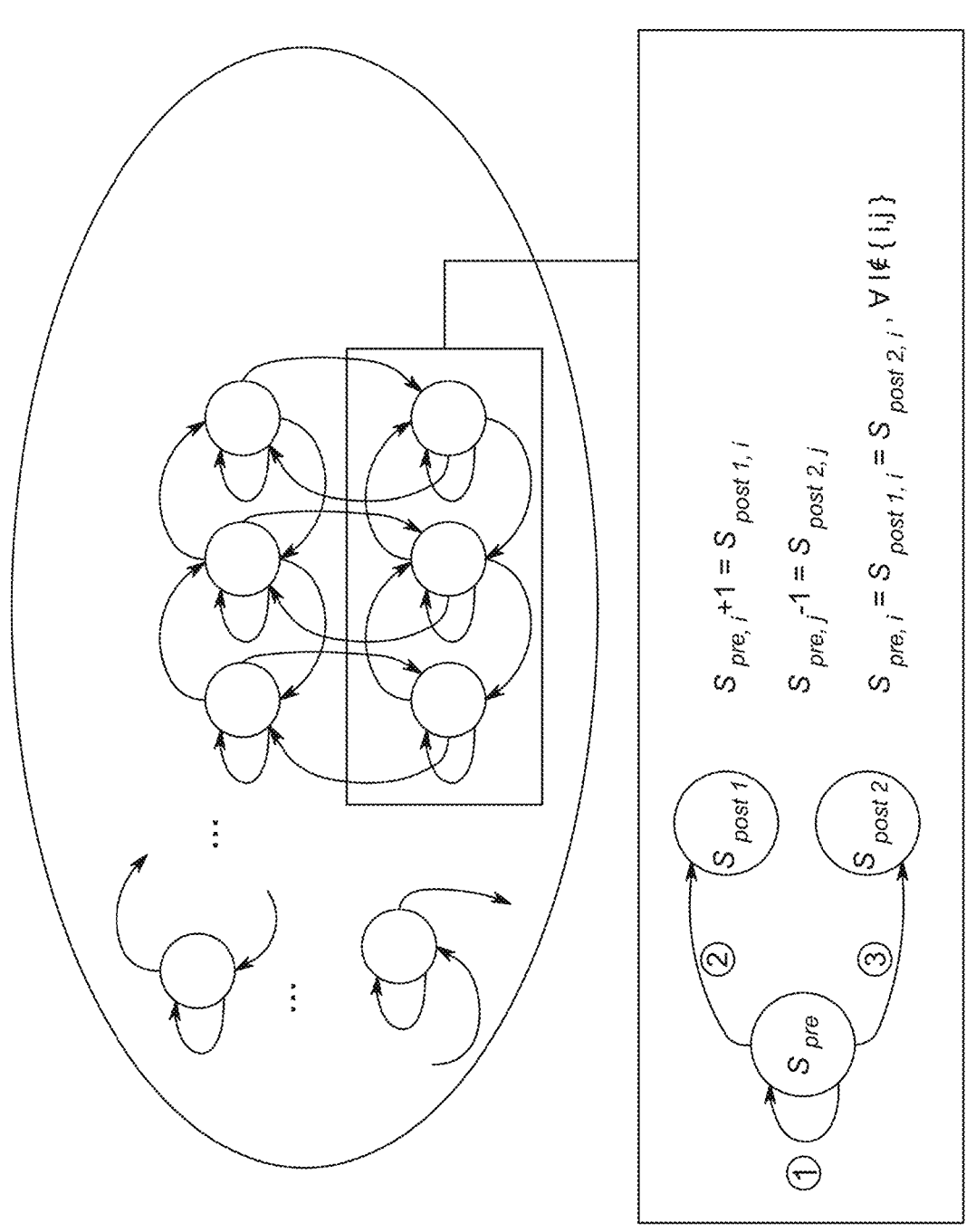

FIG. 20 shows block diagrams illustrating schematically exemplary in asynchronous slice admission, that the state is updated at request arrivals of an unscheduled sum cover increase and/or upon loss detection by the system. For the Reference number in FIG. 17: (1) a request to create a slice is rejected, (2) a request to create a type-i slice is accepted, and (3) a request to release a type-j slice is accepted. The grey region above is the admissibility region.

Figure 21:
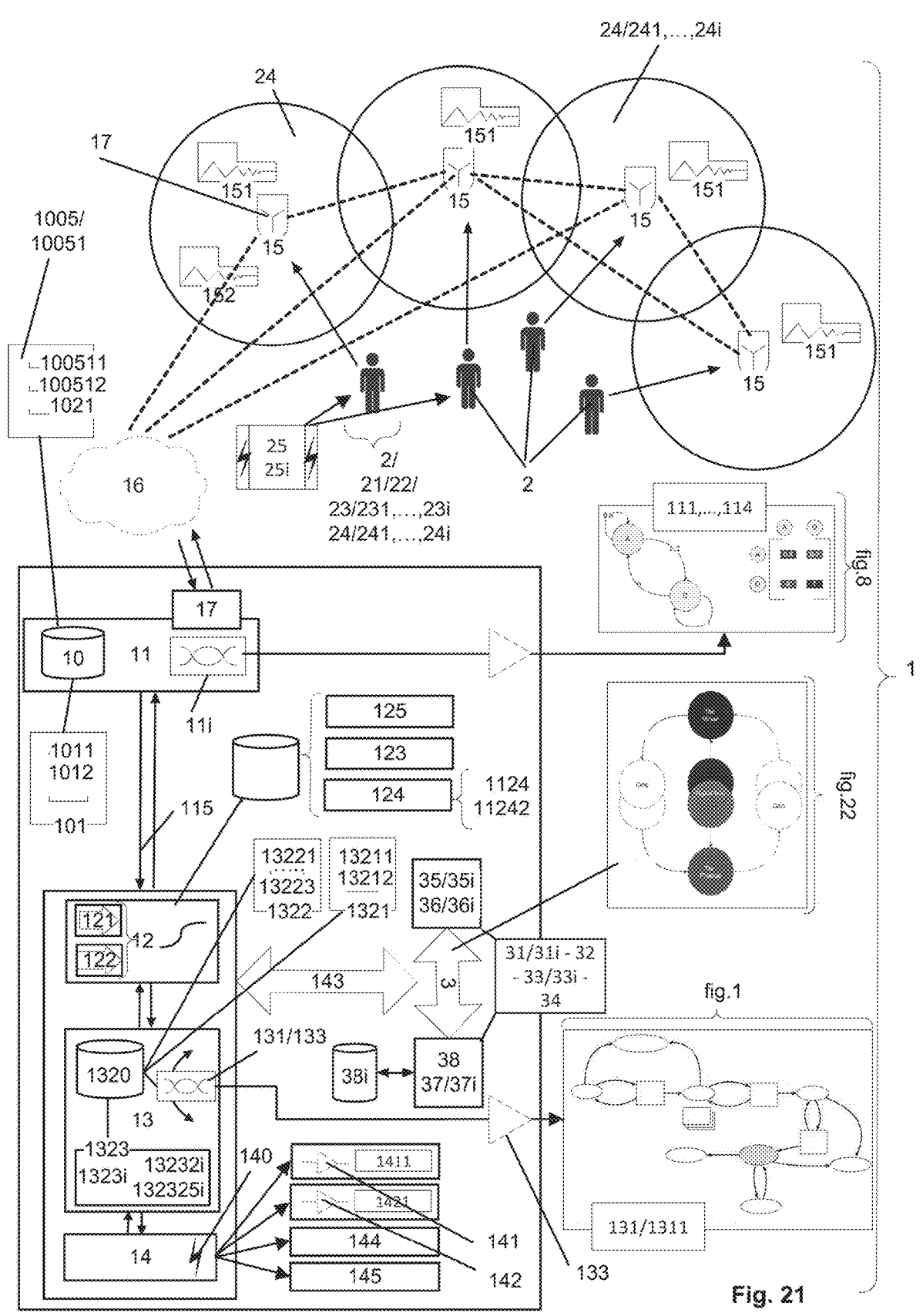

FIG. 21 shows a block diagram exemplarily illustrating an electronic, digital, finite state system 1 for automated processing a digital object 132 by object-state triggered processes 131, the digital object 132 being capturable or being defined by a set of parameters 1321 with definable parameter values comprising at least structural parameters 13211 or state parameters 13212 associated with the digital object 132, wherein the digital set of defined parameter values 1321 define an initial state and/or set-up 1322 of the object 132, wherein the object 132 is automatedly processed by the digital systems 1 by processing the digital object (132) by a sequence of process steps 1311 through which the digital object 132 passes from the initial state 13221 to a final state 13223 via intermediate states 13222.

Figure 22:
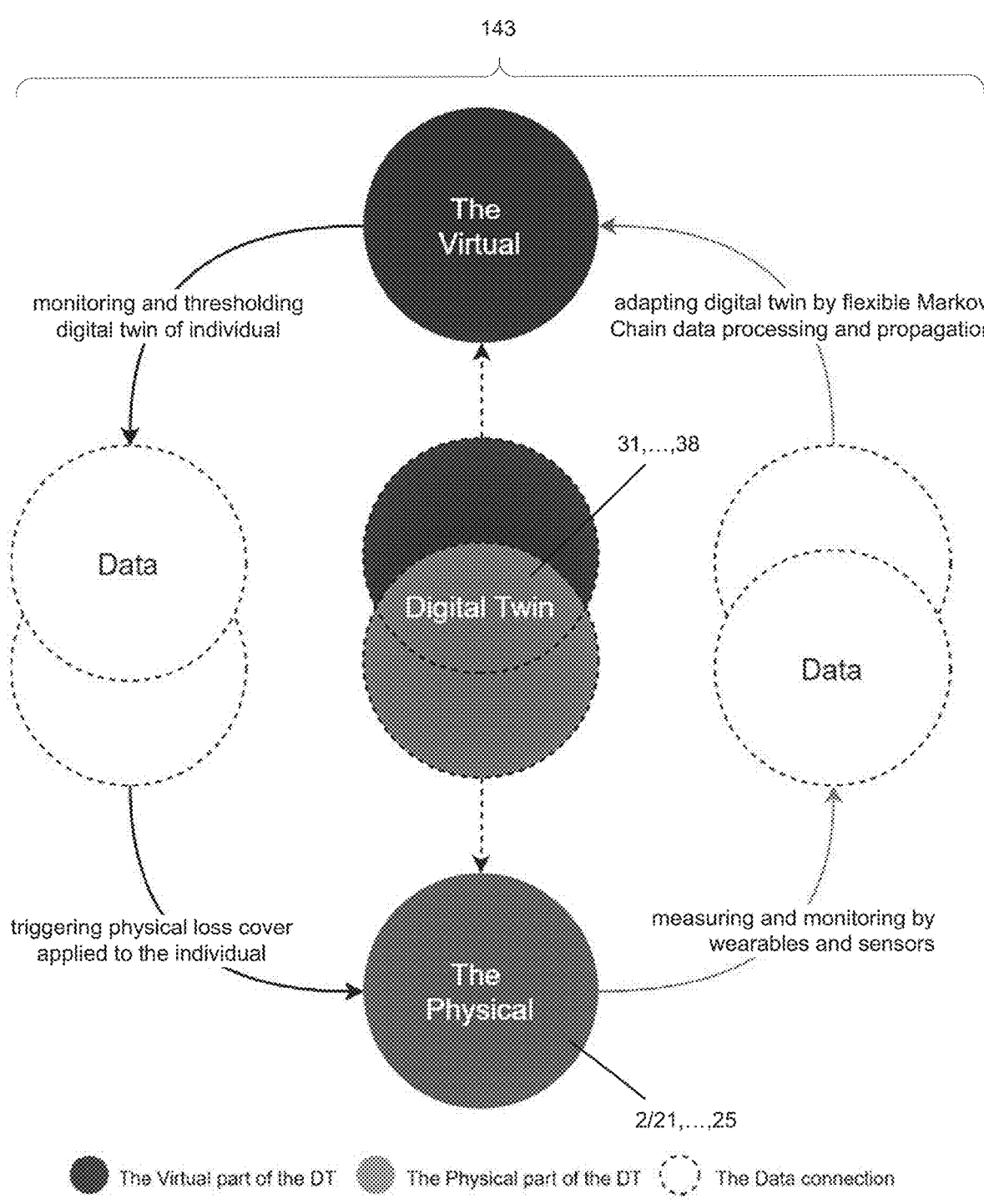

FIG. 22 shows a block diagram illustrating schematically the triggering of an automated digital twin structure adaption steered by output signal 143 generated by digital individual measuring engine 3 based on measured parameter values of wearables/IoT sensory 15, and on the other side the feedback of monitored and/or detected by thresholding of the digital twin parameters to the simulation engine 12 and/or the Markov Chain structure 11 and/or the finite state machine engine 13.

DETAILED DESCRIPTION OF THE PREFERRED EMBODIMENTS

FIGS. 1-22 schematically illustrate an architecture for a possible implementation of an embodiment of the inventive electronic, digital, finite state system 1 and corresponding method for automated processing a digital object 132 by object-state triggered processes 131, the digital object 132 being capturable or being defined by a set of parameters 1321 with definable parameter values comprising at least structural parameters 13211 or state parameters 13212 associated with the digital object 132, wherein the digital set of defined parameter values 1321 define an initial state and/or set-up 1322 of the object 132, wherein the object 132 is automatedly processed by the digital systems 1 by processing the digital object (132) by a sequence of process steps 1311 through which the digital object 132 passes from the initial state 13221 to a final state 13223 via intermediate states 13222.

The digital system 1 comprises a finite state machine engine 13, wherein the processing of each digital object 131 is based on a finite state automaton 1323 comprised in or associated with the digital object 131. The finite state automaton 1323 comprises all possible states 13231 and associated transition rules 13232 for the digital object 132. The transition rules 13232 at least comprise process steps 132321 and condition parameter values 132322 for the digital object 132 to be processed from one finite state 1322 to a next finite state 1322 by the finite state machine engine 13. A finite state automaton or state machine 1323, as used herein, is a machine structure that, at a given time can be in exactly one state from a finite set of states. One important subset of states contains initial states. When the automaton is switched on, it can be in any of the initial states. When input from finite input variables is fed to the automaton, and certain conditions or constraints are met, the automaton can leave its current state and switch to a next state. This is called a state transition. If the automaton is in a final state when there is no more input, it is said to have accepted its input.

In the inventive system, the possible states 13231 and their transition rules and/or functions 13232 for the digital object 132 are configurable within the digital object 132, and are implicitly processed as part of an initial object configuration process 133, wherein the initial state and/or set-up 13221 of the object 132 at least comprise the possible states 13231 and associated transition rules 13232 as initial digital object configuration 13233. The digital set of defined parameter values 1321 can e.g. be given by digital policy parameter values 132131 of a policy 13213 for a loss-cover related to an exposure of a risk-exposed unit 2 in case of the occurrence of a defined physically impacting event 25, wherein the processing states 1322 are given by the policy lifecycle states 132132. The transition rules 111 can e.g. at least comprise automated transition triggers 132323 and/or transition threshold values 132324 and transition processes 132325 comprising at least connect 1323251 and/or forge 1323252 and/or junction processes 1323253. Further, the automated transition triggers 132323 trigger transitions automatically or by default, wherein an automatic transition is triggered when at least one trigger value or threshold value 132324 is detected by the digital system 1 to be reached or exceeded. The at least one trigger value or threshold value 132324 can e.g. be monitored by the finite state machine engine 13, wherein if a parameter value associated with the digital object 132 is reached or exceeded, the trigger 132323 triggers the state transition. The policy lifecycle states of the whole policy can be processed and automatically managed based on a finite state engine. With this approach, the possible states, and their transition rules for a digital object, such as an insurance product, can be configured in the digital object/product as such, state transitions are not executed from an external instance like a workflow engine, but they are done implicitly as part of the object/product configuration.

The inventive digital system and digital platform uses an implicit object/product configuration approach and the choreography of the policy lifecycle is implicitly set by transition rules in the digital object/product which are then considered by a finite state engine to change policy states. It is a computational structure that parameterizes a risk-transfer product with a finite number of states, where a policy can only be in one state at a time. The policy transitions from one state to another in response to some external inputs like lifecycle events (e.g. customer buys, policy claimed, policy end date reached) and a set of configured transition rules. This makes the behavior of the policy implicit and allows for significant changes in the object/product lifecycle by simple configuration changes in the underlying transition rules. See FIG. 1 for an exemplary state transitions of a policy with associated events and FIG. 2 showing an exemplary implementation of a state transition engine with an actual transition example.

The digital system can e.g. comprise a calculation engine 11 comprising a data structure for capturing and/or storing deterministic transition and interest rate parameter values of a state discrete process to conduct data processing per policy, wherein parts of the process are used with stochastic transition and interest rates of a discrete process for conducting simulations on portfolio level, wherein the digital system comprises an interface to the finite state machine engine, wherein for the digital object processing at least interest parameter values and/or transition rate parameter values are user-specific and flexible configurable and/or selectable from an associated digital library, wherein, within the finite state machine engine, setup parameters and stochastic transition rates are processed and modelled or simulated by the finite state machine engine, wherein the digital system comprises a slice generator, wherein data processing is sliced by taking place on a slice level and aggregated on a state of benefit and quote level, wherein a slice is created whenever a policy benefit is subject to an unscheduled sum assured increase, and wherein for each newly applied risk-transfer each benefit starts with one slice, each slice being related to the specific risk-transfer version, cover and tariff at that a respective point in time, the slice is generated for. Every finite state of a policy is made up of one or multiple benefit slices. The calculation engine processes the parameter values on a per slice basis and/or cycle, providing traceable pricing parameter values generation and outputs. The calculation engine can e.g. comprise an object or product framework setting a full set of allowable configuration options on product and/or benefit and/or tariff level, of which subsets can be used to configure an individual risk-transfer. The product or object framework further can e.g. comprise a product entity framework with an initial setting of the product framework comprises at least premium frequency yearly and monthly. The initial setting of the product framework can e.g. comprise at least premium frequency yearly and monthly, wherein the parameter values are enhanceable over time. The product framework can e.g. further comprise a benefit entity framework defining a full set of allowable configuration options on benefit level, of which subsets are useable by benefits. The product framework can e.g. further comprise a tariff entity framework defining a full set of allowable configuration options on tariff level, of which subsets are useable by tariffs. Adaptable premium rate tables can e.g. be located on tariff level in order to have the ability to always apply the latest premium rate tables per policy slice.

It has to be noted, that the inventive finite state automaton and engine 13 can be applied to many practical technical problems, not only to risk-transfer technology. For example, nowadays, when workflow-based programming is gaining more and more importance among programming technology. Workflows can be mapped to an automaton that governs any kind of rule-based process driving the workflow. Although sophisticated technical frameworks supporting workflow-based programming have emerged, yet there are various cases when it is important to make implementation technically more adaptive and granular, in particular more controllable on the process-step level. This should be done without exposing too many parts of the internal behavior to them or force them to setup complicated environments or even use additional designer tools. The inventive system provides a technical structure, which allows to overcome those technical problems of prior art finite state automaton. The inventive system introduces a simple, yet effective technical way of integrating finite state automata to any rule-oriented applications. This has, inter alia, a positive technical effect of the efficiency, manageability, and testability of completed pieces of soft-ware. When rule-based processes or finite state automata are discussed in this application, the possible states and state transitions are specified along with the state transition conditions, this is how the automaton is described herein. Any formal description has technically to be converted to functional rules. The conversion can take place automatically, so the implementation can be generated, if necessary, even dynamically. This is one of the important technical advantages of the present finite state machine engine 13 with the possible states 13231 and their transition rules 13232 for the digital object 132 building a part of the digital object 132, itself, to be processed, and which are configurable within the digital object 132, and are implicitly processed as part of an initial object configuration process 133.

Further, the electronic, digital, finite state system 1 can e.g. comprises a Markov Chain modelling structure and/or predictor for mortality probability parameter value propagation 121 and for dynamic and automated impact-cover pricing 122 by processing a plurality of individual mortality-related measuring parameters 123 associated with a portfolio 124 of loss-covers 1241 of risk-exposed individuals 2, wherein each loss-cover 1241 held associated with the portfolio 124 is set by risk-transfer parameters 12411 of a loss-covers 1241 as risk-transfer policy defining parameter-based the individual risk-transfer 1241. A combination of a Markov Chain modelling structure 11 with configurable elements are applied at least comprising states 114 and/or state transitions 113 and/or cash-flows 112 specific to the risk-transfer 1241, and wherein a stochastic Markov data processing is applied to the Markov chain structure 11 over a sequence of possible events 25/25$i$ in which the probability value of each event 25/25$i$ depends only on the state 114 attained in the previous event 25. The digital system 1 comprises a simulation engine 12 comprising a data structure 11 for capturing and/or storing deterministic transition 113 and interest rate parameter values 112 of a state discrete process 121 to conduct data processing per policy 1241, wherein parts of the process 12 are used with stochastic transition 113 and interest rates 112 of a discrete process for conducting simulations on portfolio level. The digital system 1 comprises an interface 13 to the Markov chain structure 11, wherein for the stochastic Markov data processing 2, interest parameter values 112 and transition rate parameter values 113 are user-specific and flexible configurable and/or user-specific selectable from an associated digital library 125, and wherein within the stochastic Markov data processing setup 111, . . . , 114 and stochastic transition rates 113, these underlying rates 113 are processed and modelled by the finite-state Markov chain structure 11. For the data processing by the finite-state Markov chain structure 11, one or more transition functions 111 are configurable via the data interface 13 and/or selectable from the digital library 125, the transition functions 111 linking at least two states 114 within the Markov chain structure 11 wherein all states 114 of the Markov chain structure 11 are linked to an antecedent and a successive state 114 providing the data processing over the whole configurable Markov chain structure 11.

The digital system and platform 1 comprises the signal generator 14, which can e.g. automatically generate an electronic signaling 140, . . . , 145 based on the output parameter values of the electronic Markov Chain structure 11, the electronic signally being transferred to an automated underwriting system of the digital system 1 triggering at least one automated underwriting process 141 by assigning automatically at least one risk-exposed individual 2 processed by the Markov Chain structure 11 to a risk-transfer 1241 associated with a future occurrence of physical event 25 physically impacting the at least one risk-exposed individual 2. The signal generator 14 can e.g. automatically generate an electronic signaling 140 based on the output parameter values 115 of the electronic Markov Chain structure 11, the electronic signally 140 being transferred to an automated digital portfolio management system 1421 of the digital system 1 automatically adapting threshold values for at least one risk-exposed individual 2 processed by the Markov Chain structure 11, the at least one risk-exposed individual 2 being automatically assigned to the portfolio 124, where an occurring loss and/or damage and/or injury of an individual 2 associated with a future occurrence of physical event 25 physically impacting the at least one risk-exposed individual 2 is automatically covered by the system 1.

As discussed, the setup of assessment and generation of risk transfers and cashflows can e.g. be based on Markov-Chains in the digital system and digital platform, and can be done flexibly as outlined below, but this assessment as such is in general stateless. What is being considered as part of the simulation approach is a certain state of a benefit and it's transition in the context of probabilities in the Markov Chain based assessment but this applies to the risk as such and not to the policy lifecycle states (see FIG. 3). Thus, for the inventive life risk parameter propagation and for dynamic and automated risk-transfer pricing by the digital system by processing a plurality of individual risk-related parameters associated with a portfolio of risk-transfers of risk-exposed individuals. The pricing is dynamically performed and also the dynamic generation of the risk-transfer premiums for an individual policy using a combination of a Markov Chain modelling structure and configurable elements at least comprising states and/or state transitions and/or cash-flows specific to the product it instantiates. Each risk-transfer held associated with the portfolio is set by risk-transfer parameters of a risk-transfer policy defining the individual risk-transfer. A combination of a Markov Chain modelling structure with configurable elements are applied at least comprising states and/or state transitions and/or cash-flows specific to the risk-transfer. A stochastic Markov data processing is applied to the Markov chain structure over a sequence of possible events in which the probability value of each event depends only on the state attained in the previous event. Policy, as understood herein, is a deliberate system of rules and parameter settings to guide risk-transfer and achieve risk cover as a rational outcome. A policy can e.g. be implemented as a procedure, or protocol, or parameter value settings defining the conduct of the risk-transfer, i.e. the operation of an automated risk-transfer system during risk coverage. Life risk is herein understood as a physical measure of the probability that a certain event will happen during a person's lifetime. For example, for cancer, this can be given as the measurable likelihood value that a specific person who is free of a certain type of cancer will develop or die from a certain type of cancer during his or her lifetime. The probability measure for the risk can e.g. be assessed and/or forecasted by the system for a certain future time window or time range. The inventive system is kept within the framework of continuous time. Payment transfers triggered on a discrete time basis can be regarded in the system as a series of endowments in continuous time and therefore need no special consideration. The force of interest $\delta$ will be taken to be constant throughout. Generalization to the case of a time-dependent or even random $\delta$ is trivial. As usual, $v = e^{-\delta}$.

The technical structure is built in terms of a time-continuous Markov chain model with the state space {1, 2, . . . , N} with N≥2 (see below for the extension to a countable state space.) A sample path of the chain will be represented by the development of a specific risk-transfer policy. Time 0 can be defined as the time of come in force of the risk-transfer policy. A state of the policy at time t in denoted herein by S(t), and the states are numbered so that S(0)=1. The transition probabilities of the process can be defined for t≥ s by $$P_{jk}(s, t) = P\{S(t) = k | S(s) = j\}$$

It can e.g. be assumed that $P_{jk}(s, t) = \delta_{jk}$ as t approaches s from above for all j, k, s≥0, where $\delta_{jk}$ is a Kronecker delta. Further, it can e.g. also be assumed that the force of transition from state j to state k, defined by $$\mu_{jk}(s) = \lim_{\Delta s \to 0+} P_{jk}(s, s + \Delta s)/\Delta s$$

Exists for s≥0 and is a continuous function of s. The total force of decrement from state j can be defined for s≥0 by $$\mu_j(s) = \lim_{\Delta s \to 0+} \{1 - P_{jj}(s, s + \Delta s)\}/\Delta s$$

$$\text{where } \mu_j(s) = \sum_{k \neq 1} \mu_{jk}(s)$$

By these assumptions, for all s≥0, each $P_{jk}(s,.)$ is continuous for all t≥s. Similarly, for each t>0, each $P_{jk}(., t)$ is continuous for all s in the closed interval [0, t]. One can also show that in this case the number of transitions made by a sample path in any restricted time interval is stochastically smaller than some Poisson distributed random variable.

In the inventive approach, the simplest kind of risk-transfer policy has just two states. The policy is in force in state 1, and it expires immediately upon entry into state 2. (Naturally it may also expire in state 1 at the end of the risk-transfer period. This kind of treatment can pertain to all types of risk-transfers and will not be repeated in each case.) An ordinary life risk-transfer and life annuity can be of this sort. It is referred herein as a single-portfolio single-decrement policy. A second kind of policy has N>2 states, but the policy still expires immediately after decrement from state 1. (The joint-life annuity is an example.) This is referred herein as a single-portfolio multiple-decrement policy. A policy may be in force in several of the states of the system. If there are m such states, it is referred as an m-portfolio policy and the m states are referred to as portfolio states. Such a risk-transfer policy with unspecified value for m is a multiple-portfolio policy. An example can be provided by the common disability annuity.

Typically, m<N, and there is a set of N−m states with the property that the policy expires upon entry into a state of the set. Such states may be called external states. The life annuity with k years of payment transfers certain shows, however, that in some cases all states of a policy are portfolio states (N=m).

Payment transfers are generally made as annuities when the risk-transfer policy remains in a certain set of states, as endowments, or as lump sum benefits upon transition from one state to another. Certain interesting kinds of policies differ from this pattern, however. The life annuity with k years of payment transfers certain mentioned above is a case in point. The external states are absorbing, and this may also be the case for certain portfolio states. More often, however, portfolio states are transient, i.e. there is a probability less than 1 of ever returning to such a state once it has been left. If this return probability equals zero for a state, it is referred herein as strongly transient. Such states are very common in risk-transfer structures. Observation of the movements of a risk-transfer policy is made as long as it is in force and is discontinued upon expiry.

The set up the Markov Chain modelling structure, forces of transition have to be selected. For example, if a disability risk-transfer structure has three states in the Markov Chain modelling structure, e.g. referred to as "active" (or state 1), "disabled" (or state 2), and "dead" (or state 3). In symbols, $$P_{11}(s, s+t) = {}_tP^{aa}_{[x]+s}, \ P_{12}(s, s+t) = {}_tP^{ai}_{[x]+s}, \ P_{21}(s, s+t) = {}_tP^{ia}_{[x]+s}, \ \text{etc.,}$$

where the topscript a stands for "active" and the topscript i stands for "invalid". As indicated by writing the age x (which represents the age at issue of the beneficiary) in brackets, the probabilities can e.g. be select in the sense that they may depend on all three variables x, s, and t, separately, and not only on x+s and t. Thus $$\text{e.g. } {}_tP^{ia}_{[x]+s}$$

is the probability that a person with age x of entry, who is in the disabled state at age x+s, shall have recovered by age x+s+t.

The forces of transition are (i) the force of mortality for an able person:

$$\mu_{13}(t) = \mu^{a}_{[x]+t},$$

(ii) the force of disablement: $\mu_{12}(t) = v_{[x]+t}$, (iii) the force of recovery: $\mu_{21}(t) = \rho_{[x]+t}$, and (iv) the force of mortality for a disabled person:

$$\mu_{23}(t) = \mu^{i}_{[x]+t}.$$

As state 3 is absorbing, $\mu_{31}(t) \equiv \mu_{32}(t) = 0$. It should be noted that the age in brackets in these symbols consistently is the age when the policy was effected. Thus e.g. $\rho_{[x]+t}$ is not the force of recovery of a person aged x+t who was disabled at age x.

Formulating in general terms what is exemplified above, it can be noted that the forces of transition can depend on variables and/or parameter values (such as "age at issue") the values of which are kept fixed throughout the period of observation, as well as on duration t since issue. In such simple life-death processes as the ones on which the structure of the life risk-transfer and the life annuity are based, the present structure therefore sufficiently accounts for the ordinary kinds of select mortality. Since the values of the fixed variables are given right from the time of issue of the policy, the corresponding forces of transition are referred to as issue-select. The forces of transition in disability risk-transfer probably depend on variables like age at present disablement and duration of present disablement rather than age at issue and duration since issue. In cases where the value of the forces of transition at time t can depend on duration in the state S(t) in which the sample path dwells, the forces can be referred to as present-state-select. Thus, it can be distinguished for this example between two kinds of select forces. Obviously one can conceive of structure where the forces of transition are select in both ways. A three-state disability process can be used as an example once more. It is conceivable that the force of recovery $\rho_{[x]+(u)+t}$ may depend both on age x at issue, age x+u at the latest disablement, and duration t of the present disablement. The theory of the present paper does not account for present-state-select forces of transition. For simplicity, the possibility of issue-select forces can e.g. be disregarded to start with.

The digital system comprises a calculation engine using deterministic transition and interest rates of a discrete process to conduct calculations per policy, wherein parts of the process are used with stochastic transition and interest rates of a discrete process for conducting simulations on portfolio level. In particular, the calculation engine comprises a data structure for capturing and/or storing deterministic transition and interest rate parameter values of a state discrete process to conduct data processing per policy, wherein parts of the process are used with stochastic transition and interest rates of a discrete process for conducting simulations on portfolio level, The digital system comprises a user interface to the Markov chain structure, wherein for the stochastic Markov data processing, interest parameter values and transition rate parameter values are user-specific and flexible configurable and/or selectable from an associated digital library, and wherein within the stochastic Markov data processing setup and stochastic transition rates, these underlying rates are processed and modelled by the finite-state Markov chain structure. The digital library can e.g. be accessible by a plurality of users, wherein the transition functions and/or the interest parameter values and/or the transition rate parameter values of a user are accessible by another user via the data interface and applicable to the other user's finite-state Markov chain structure. The transition functions and/or the interest parameter values and/or the transition rate parameter values of a first user can e.g. only be accessible upon request of a second user and/or upon approval or enablement by the first user to the second user.

For the data processing by the finite-state Markov chain structure, one or more transition functions are configurable via the data interface and/or selectable from the digital library, the transition functions linking at least two states within the Markov chain structure wherein all states of the Markov chain structure are linked to an antecedent and a successive state providing the data processing over the whole configurable Markov chain structure.

As an embodiment variant, dependences between the rate parameters can e.g. be applicable within the finite-state Markov chain structure. The finite-state Markov chain structure can e.g. further comprise elements providing flexible configuration for the use of combined model structures for stochastic interest parameter values and/or mortality rate parameter values. The stochastic Markov data processing of the interest parameters and mortality rate parameters can be configured by affine data process structures, wherein the finite-state Markov chain structure becoming a traceable model structure during propagation of the parameter values to a defined future time window. For the flexible configuration, the digital system can e.g. comprise adaptable calculation configuration files and/or trees processable by the calculation engine of the digital system. The Markov chain structure can e.g. be realized as a continuous time Markov chain structure with a finite or countable infinite state space providing a stochastic process for parameter propagation. Further, the Markov chain structure can e.g. be provided by the digital system only for time-homogeneous Markov chain processes, where all probability values providing a measure for a life risk within a future time window are generated based on the Markov property.

The system can e.g. comprise a slice generator, wherein data processing is sliced by taking place on a slice level and aggregated on a state of benefit and quote level, wherein a slice is created whenever a policy benefit is subject to an unscheduled sum assured increase, and wherein for each newly applied risk-transfer each benefit starts with one slice, each slice being related to the specific risk-transfer version, cover and tariff at that a respective point in time, the slice is generated for. As such, the calculations can e.g. take place on a slice level and are aggregated on benefit and quote level, wherein a slice is created whenever a policy benefit is subject to an unscheduled sum assured increase, and wherein for new business each benefit starts with one slice, each slice being related to the specific product version, cover, and tariff relevant at that the respective point in time the slice is created for.

The present invention allows insurance premiums to be generated and assessed dynamically for an individual policy, using a combination of the established Markov Chain model and configurable elements (States, State transitions, Cash-flows) specific to the product it instantiates. The system comprises a calculation engine using deterministic transition and interest rates of a discrete process to conduct calculations per policy. The system can e.g. also use parts of this with stochastic transition and interest rates of a discrete process can thus support conducting simulations on portfolio level.

Figure 1:
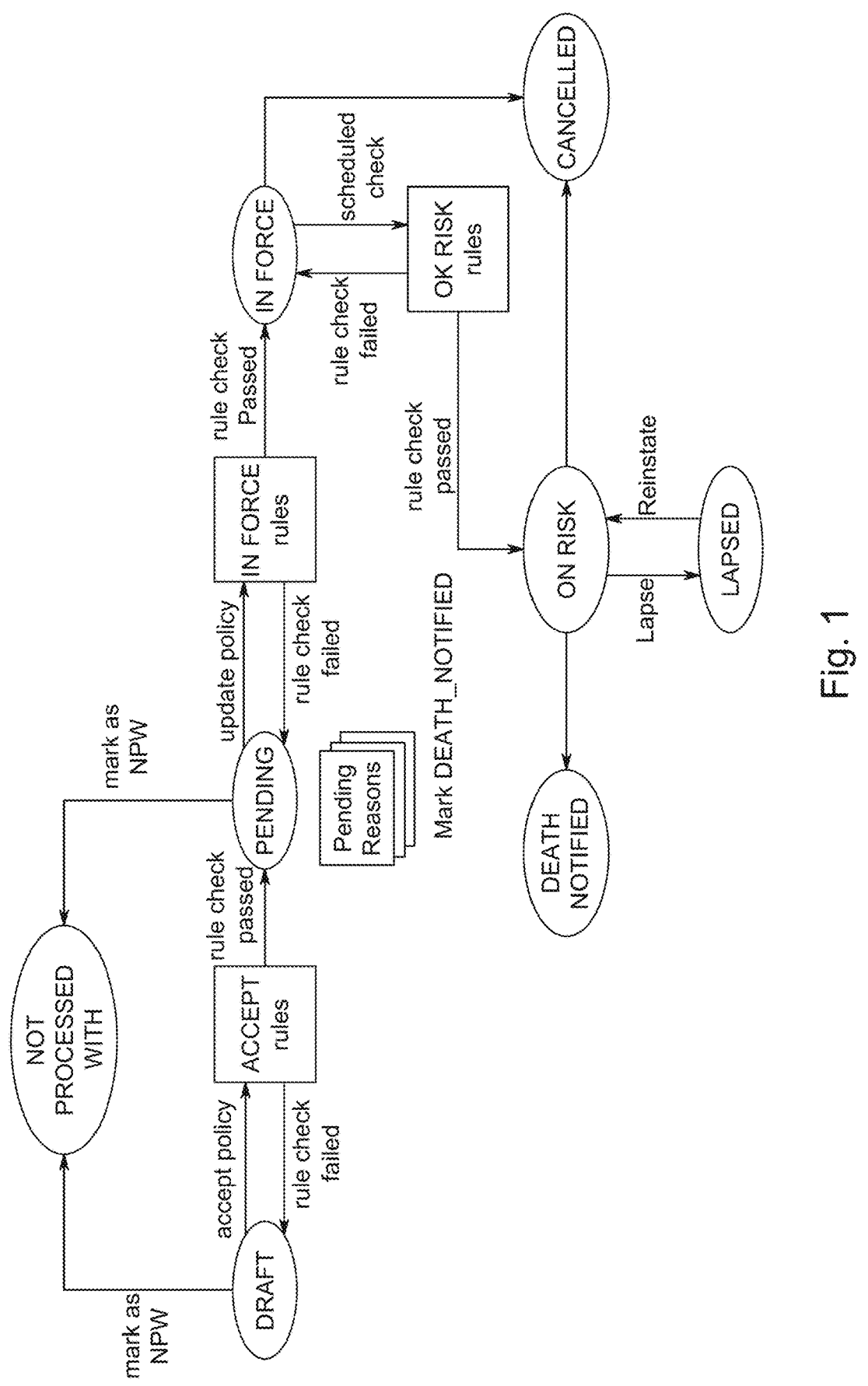
FIG. 1 shows a block diagram illustrating schematically exemplary state transitions of a policy as digital object to be processed with associated events.
Figure 2:
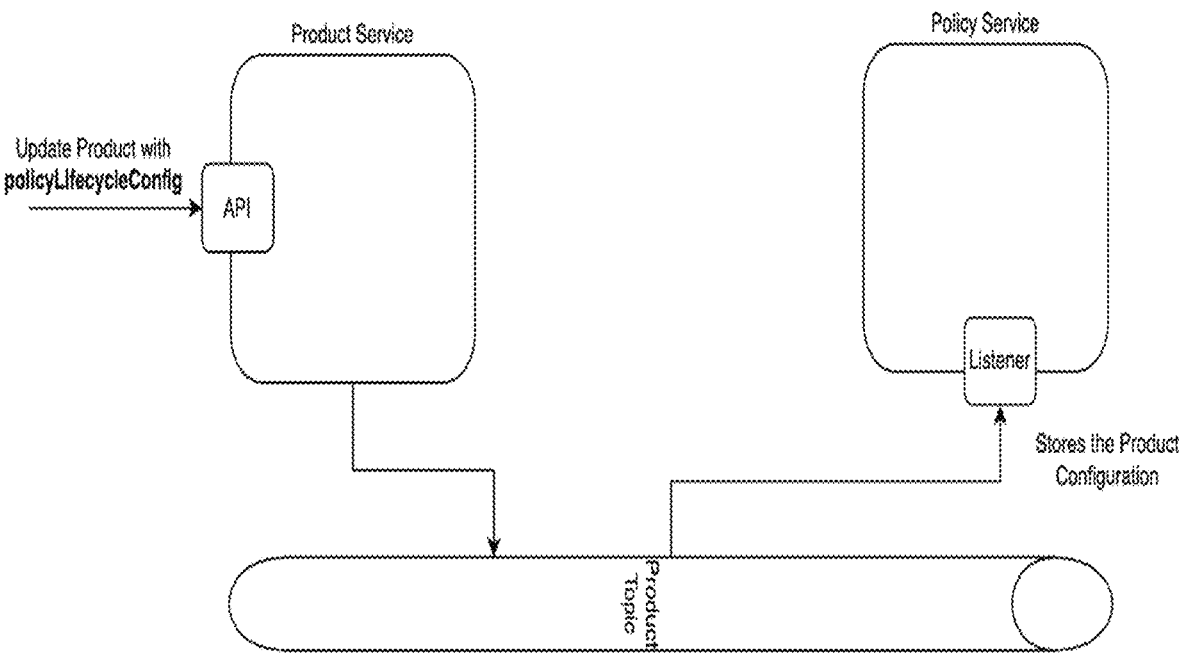
FIG. 2 shows a block diagram illustrating schematically an exemplary realization of a state transition engine with an actual transition example.
Figure 2:
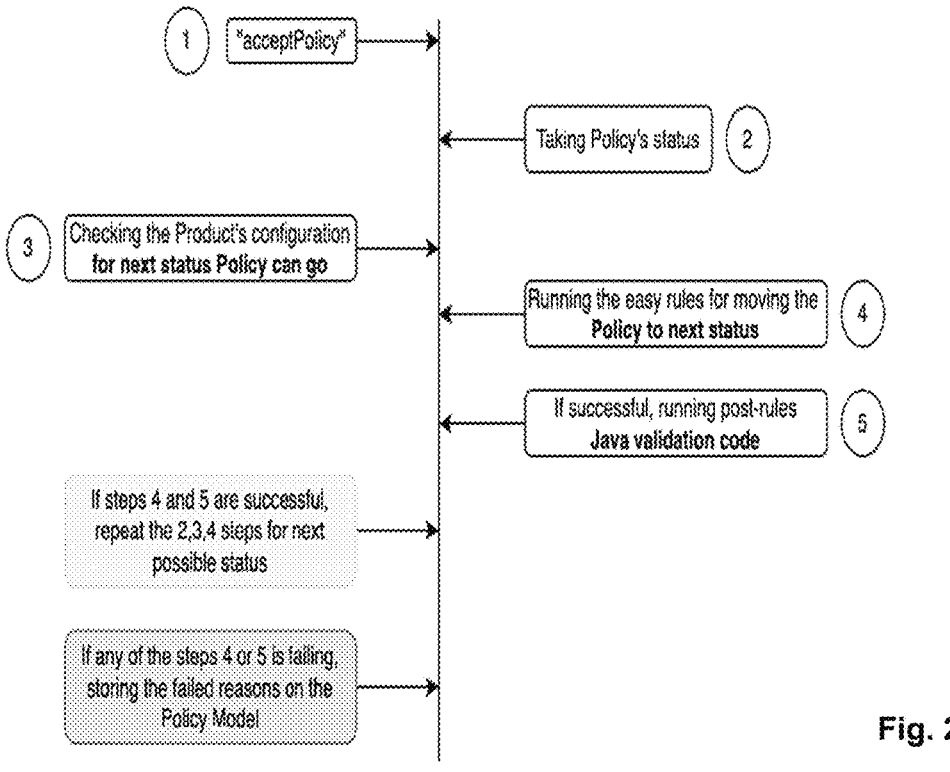

The inventive data processing and/or calculations take place on slice level and are aggregated on benefit and quote level (as shown in FIG. 1). A slice is created whenever a policy benefit is subject to an unscheduled sum cover (assured) increase, i.e. for new business each benefit starts with one slice. Each slice relates to the specific product version, i.e. risk-transfer structure version, cover and tariff that is relevant at that the respective point in time, the slice is created for. While Markov Chain modelling structures are used widely in automated insurance and risk-transfer technology and other industries, its combination with configuration elements on slice level allows a level of flexibility and dynamism that is novel and not known in the prior art.

The technical feature of slicing in the data processing of the Markov Chain modelling structure calls for efficient slice management. For this, a mechanism of slice admission control can be applied in the inventive system, which functions in a manner of state machine. As mentioned above, a slice is created whenever a policy benefit is subject to an unscheduled sum cover (assured) increase, i.e. for new business each benefit starts with one slice. As an embodiment variant, the slice generator comprises an electronic slice admission control triggered by a general state model for synchronous slice admission control and in a further embodiment variant in an asynchronous slice admission control. Technically, it can be shown that it is Markovian under a set of weak constraints. As an even further embodiment variant, an approximation of the state transition matrix is also disclosed below to reduce computational complexity in practical technical applications.

Slicing triggered by unscheduled sum cover increase, i.e. generating and/or applying a capsulated Markovian slice in the event of detecting a policy benefit is subject to an unscheduled sum cover (assured) increase, is one of the essential features of the inventive system and one of the most important enablers for its technical operability. It allows the system to automatedly manage and utilize their physical and virtual resources, i.e. the technical automated resource infrastructure for payment transfers and the capacity of virtualized transition function or transition process, in the form of logically independent virtual risk-transfer structure, a.k.a. unscheduled sum cover increase slices. It provides broad technical improvements of scalability, flexibility, accountability, shareability and profitability to the automated inventive system.

One technical objective and problem brought by cover increase slicing is to efficiently allocate resources over different slices towards better utility efficiency. More specifically, there are two typical scenarios of such inter-slice resource management. First, when the system provides direct loss and/or risk cover to end users by resource transfer and maintains loss/risk cover on its own scalable slices. Second, in the resource-sharing use cases which could be referred to as slice as a service, where as an embodiment variant, the system can pack its resources into standardized slices and rents them to third party systems such as virtual increase covered by a slice, and where to such third-party systems periodical revenue is provided by slice. In both scenarios, the present system is aimed to maximize the overall resource utility rate (e.g. the revenue rate) by adjusting its resource allocation subject to the constraints of resource pool limit and/or eventually to regulation rules.

Compared to other Markov Chain modelling structure optimization, the slicing approach is less challenging due to the stochastic nature and fluctuating behavior of the demand for pooled resources. Applying this technical framework, a binary decision can e.g. be made by the system for every slice admission, i.e. to accept or decline the increase-triggered request for a new slice. Considering the system as a state machine, state transitions are induced by the responses to arriving slicing requests. Despite the advantage of the structure, as an embodiment variant, the system's structure can be optimized even further. Slicing requests by nature can e.g. arrive in an asynchronous manner, leading to an asynchronous state modelling structure, while some embodiment variants may rely on synchronous frameworks for resource controlling and management. Second, the system's structure can e.g. only support simulative or exploitation-based triggering of the system's slicing strategies. As a further embodiment variant, the state model structure of the slice admission systems can be operated in a synchronous method, i.e. when the system autonomously makes decision to requests of an unscheduled sum cover increase periodically instead of immediately upon request of an unscheduled sum cover increase or loss detection, where the disclosed synchronous state-modelling structure is Markovian. In summary, it has to be noted that the inventive system, as proposed herein, allows to apply for an asynchronous slice admission system, technically allow to define critical concepts such as resource feasibility and slicing strategy. However, the inventive system can also be based on a synchronous slice admission modelling structure, which can be showed to be Markovian when the statistics of requests of an unscheduled sum cover increase are memoryless. The system allows to automatically assess the state transition probabilities in both single step and long term as well. The system structure is completely transparent, which allows numerically to determine the feasibility of an applied Markov model structure and the accuracy of proposed processing of the state transition matrix for the Markov chain.

In the risk-transfer technology and for the realization of an automated system, a resource pool with M different countable resources can be described with a vector $r=[r_1, r_2, \ldots, r_M]^T$. Consider N different slice types, where for every slice type $n \in [1, 2, \ldots, N]$ it costs a resource bundle $c_n=[c_{1,n}, c_{2,n}, \ldots, c_{M,n}]^T$ to maintain a slice. All slices are units. Thus, the system autonomously manages its resources by adjusting the set of active slices, which can be presented as $s=[s_1, s_2, \ldots, s_N]^T$, where $s_n$ denotes the number of type-n slices under maintenance. The allocation is subjected to the resource pool size:

$$r_m - \sum_{n=1}^{N} c_{m,n} s_n \geq 0, \forall m \in [1, 2, \ldots, M]$$

In the following, it is referred to the set of all allocations s that fulfill the above relation as the admissibility region S, which is obviously a finite set.

Slices are created by the system and released upon requests of an unscheduled sum cover increase and/or upon loss detection by the system. When a cover requires a new slice to support the requested resource transfer, it sends a request to the system, which will be either accepted or declined by the system. Upon acceptance, the requested slice will be created and continuously maintained until it is released. Technically, both the requests for creation and for release can e.g. arrive randomly. As an embodiment variant, it can be assumed that: (i) For every slice type n, the slice creation requests arrive as Poisson events with a rate of $\lambda_n$; and /ii) The lifetime of every type-n slice is an independent $\mu_n$-mean exponential random variable. Thus, a state model structure can be applied to capture the process of slice admission control, as illustrated in FIG. 18. FIG. 18 shows an exemplary asynchronous slice admission, where the state is updated at request arrivals of an unscheduled sum cover increase and/or upon loss detection by the system. For the Reference number in FIG. 18: (1) a request to create a slice is rejected, (2) a request to create a type-i slice is accepted, and (3) a request to release a type-j slice is accepted. The grey region above is the admissibility region. Each state represents a resource allocation s E S, so that the system cannot make any decision that leads to an unfeasible resource allocation conflicting with the relation given above. It is to be noted that requests for slice release are always accepted.

Generally, defining the incoming request q and the system's binary decision $d$ as $q =$ $\begin{cases} n \text{ request to generate a type-}n \text{ slice} \\ -n \text{ request to release a type-}n \text{ slice} \end{cases}$ and $d = \begin{cases} \text{request accepted} \\ 0 \text{ request declined} \end{cases}$ respectively, the post-transition state $s_{post}$ is a function of q, d and the pre-transition state $s_{pre}$:

$$s_{post} = \mathcal{T}(s_{pre}, q, d) = [s_{pre,1}, \ldots, s_{pre,|q|} + d \cdot \text{sgn}(q), \ldots, s_{pre,N}]$$

As already discussed above, when receiving a request q of an unscheduled sum cover increase, the system makes a binary decision $d \in \{1, 0\}$. If d is only a function of q and the pre-transition state $s_{pre}$, the system can be said to have a consistent slicing strategy $d=D(q, s_{pre})$. As the system cannot overload the finite resource pool or decline to release slices, given the admissibility region S, a slicing strategy D is valid only when $$D(q, s), \forall q \in \{-1, -2, \ldots, -N\}, \forall s \in S$$
$$\mathcal{T}(s, q, D(q, s)) \in S), \forall q \in \{1, 2, \ldots, N\}, \forall s \in S$$

For any valid slicing strategy D, the following is true:

$$s_{post} = \mathcal{T}(s_{pre}, q, D(q, s_{pre})) = \mathcal{T}(s_{pre}, q)$$

Coming now from the embodiment variant with an asynchronous state modelling structure of slice admission, where the updates of state, i.e. the responses of the system, are triggered by requests arriving at arbitrary or random time, to the embodiment variant with a synchronous state modelling structure. Technically, the system processes requests in a framed approach, where all arrived requests, despite of the type, will, for example, be buffered in queue and sequentially responded at the end of every operations period. This leads to a synchronous state model, where state updates are periodically triggered. The synchronous state model has self-evidently the same admissibility region S as the corresponding asynchronous state modelling structure, but more complex conditions for transitions between states. Normalizing and/or weighting the operations period length to 1, the system makes sequential decisions to buffered requests at discrete time indexes. A vector $q(t)=[q_1(t), q_2(t), \ldots, q_{Q_t}(t)]$ can e.g. be used to denote the request queue buffered during the $t^{th}$ operations period, where $Q_t$ is the total number of slicing requests arrived in that period. Given an arbitrary strategy $d=D(q, s)$, the state at (t+1) is $$s(t+1) = \mathcal{T}\left( \ldots \mathcal{T}(\mathcal{T}(s(t), q_1(t)), q_2(t), \ldots, q_{Q1}(t)) \stackrel{\triangle}{=} \hat{\mathcal{T}}(s(t), q(t)) \right)$$

With $\mathcal{T}(\cdot)$ is implemented, as above, according to the relation $$s_{post} = \mathcal{T}(s_{pre}, q, D(q, s_{pre})) = \mathcal{T}(s_{pre}, q)$$

It is important to note, that with the above relation for s(t+1) and with memoryless distributions of request arrivals and a consistent slicing strategy, the synchronous state model of slice admission is Markovian.

Figure 3:
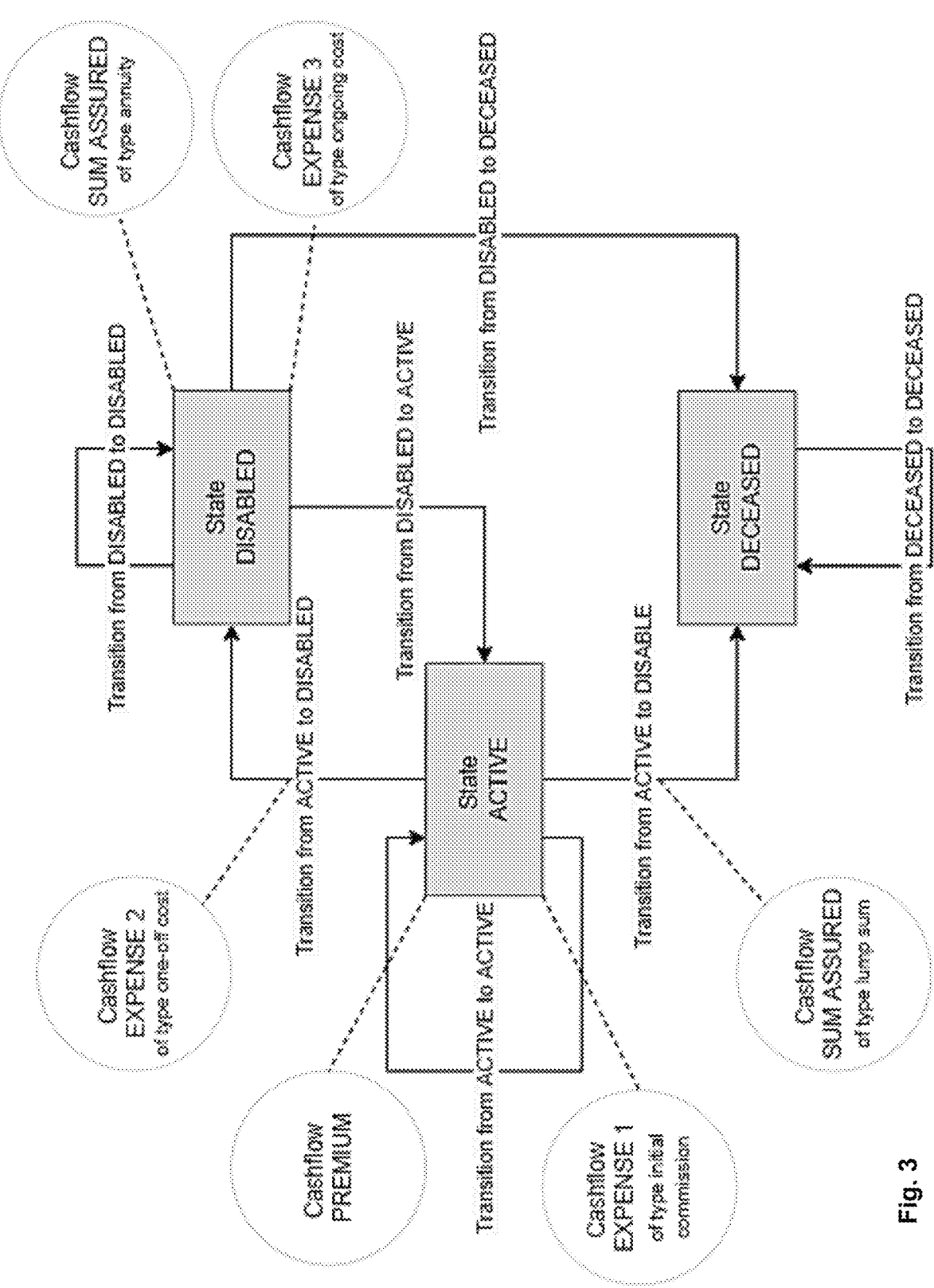
FIG. 3 shows a block diagram illustrating schematically an exemplary state-transition-cashflow-modelling structure and/or 3 state-transition-cashflow-modelling structure, i.e. exemplary benefit/slice states for the inventive Markov-Chain structure.
Figure 4:
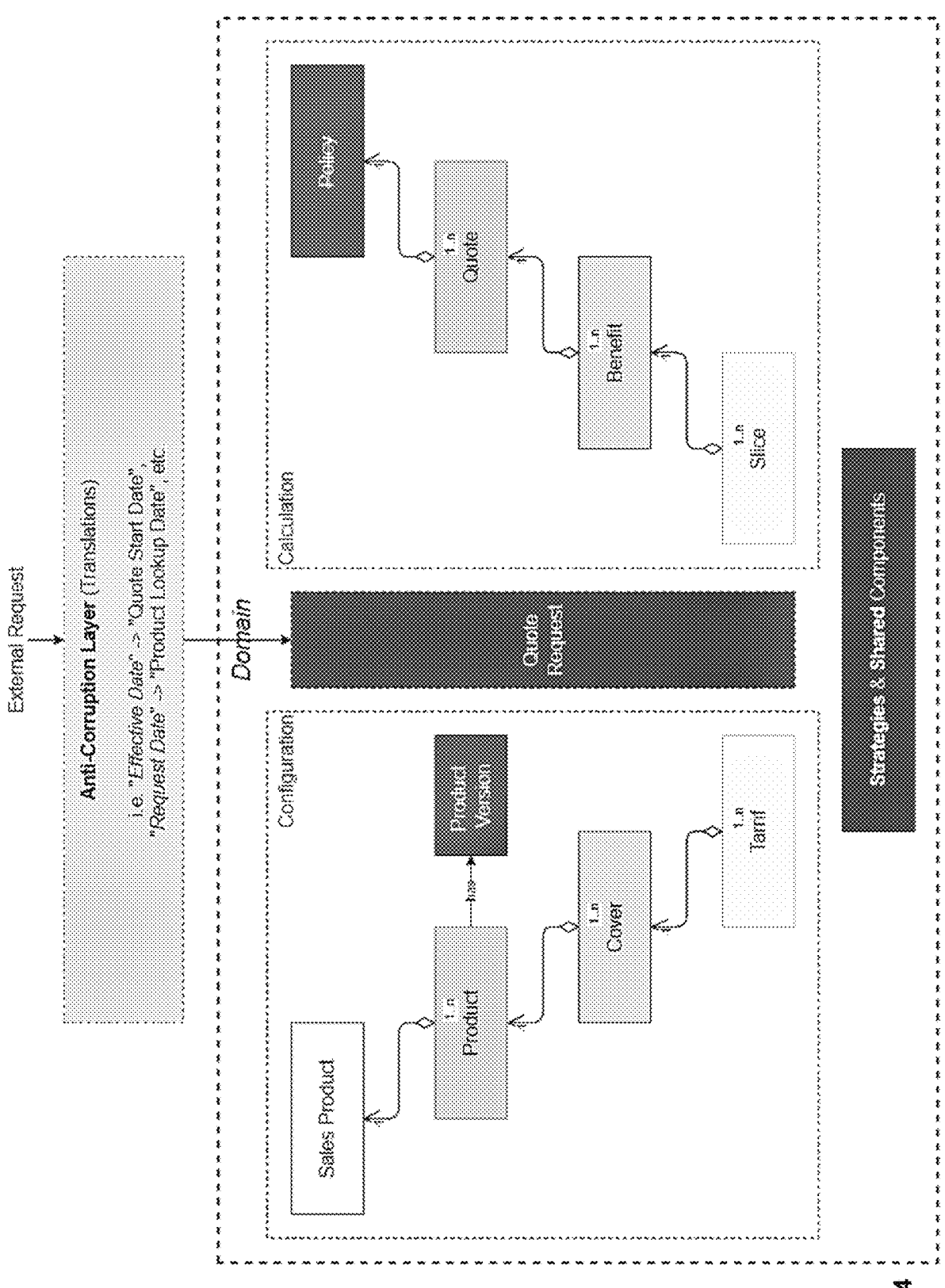
FIG. 4 shows a block diagram illustrating schematically exemplary the relationships between the configuration and the calculation, as well as the hierarchy of the configurable elements themselves.

FIGS. 2 to 4 show block diagrams illustrating schematically an exemplary overview of slices with FIG. 2 showing the color legend and FIG. 3 the according slice processing.

Figure 5:
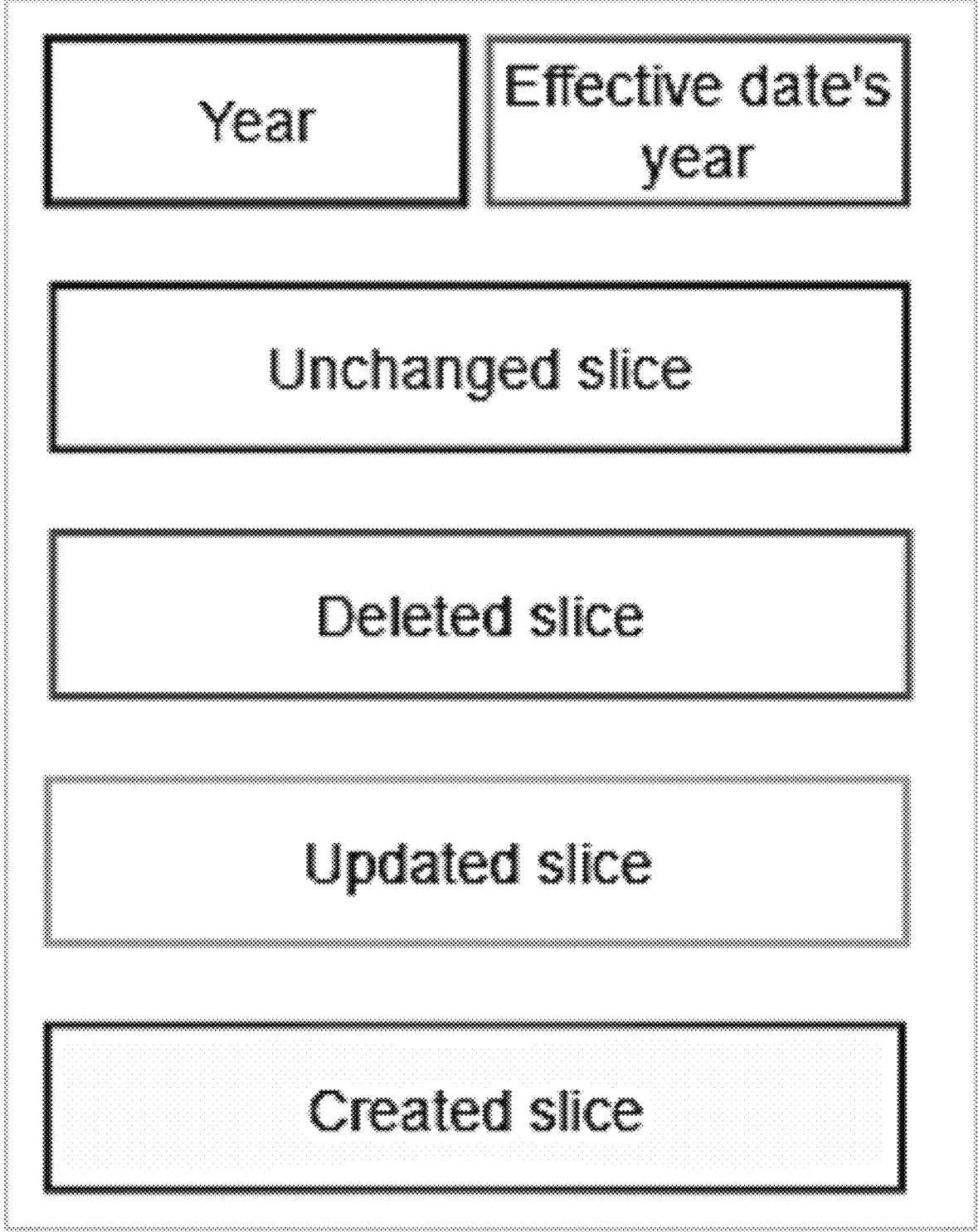
Figure 6:
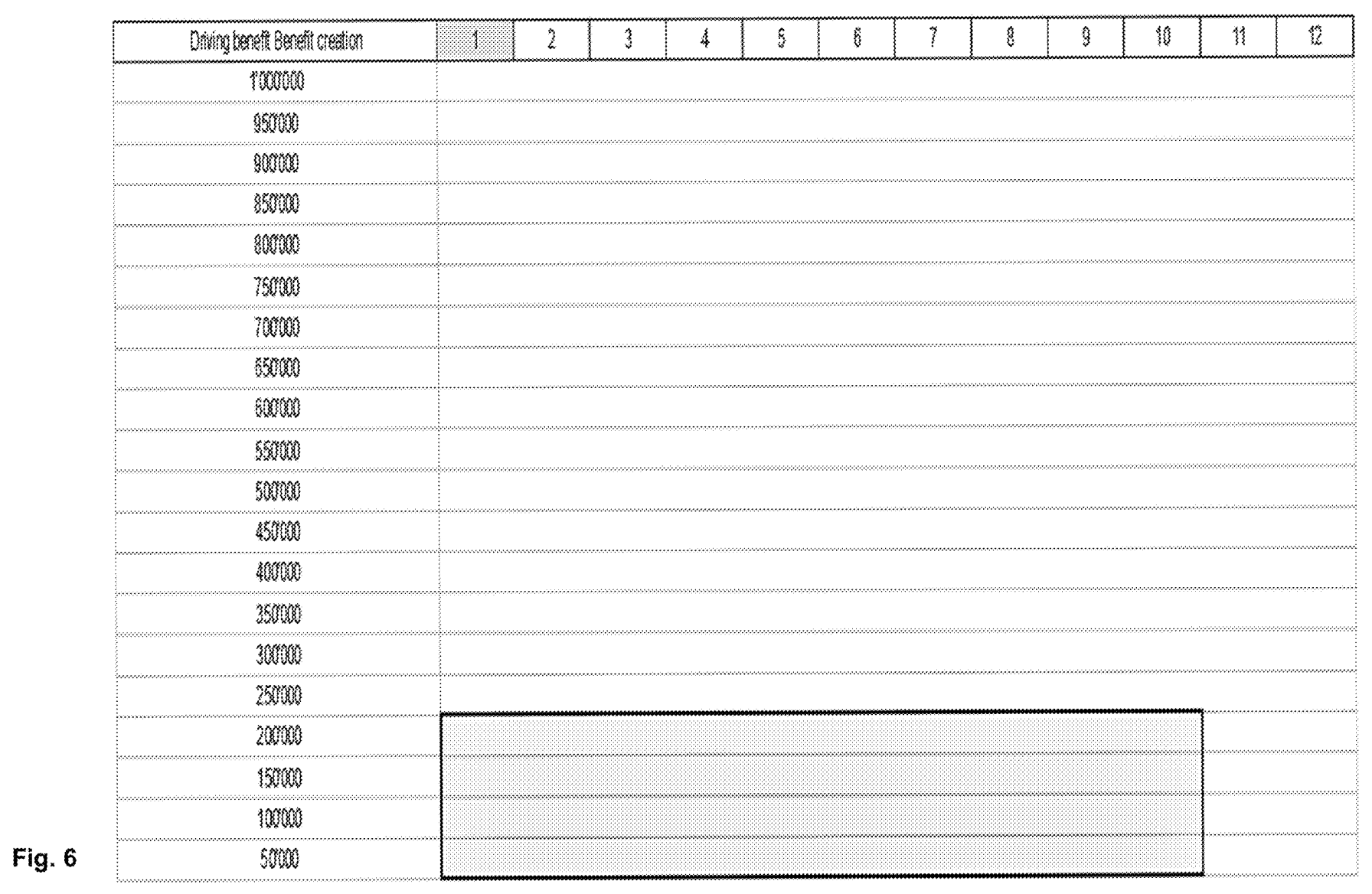
Figure 6:
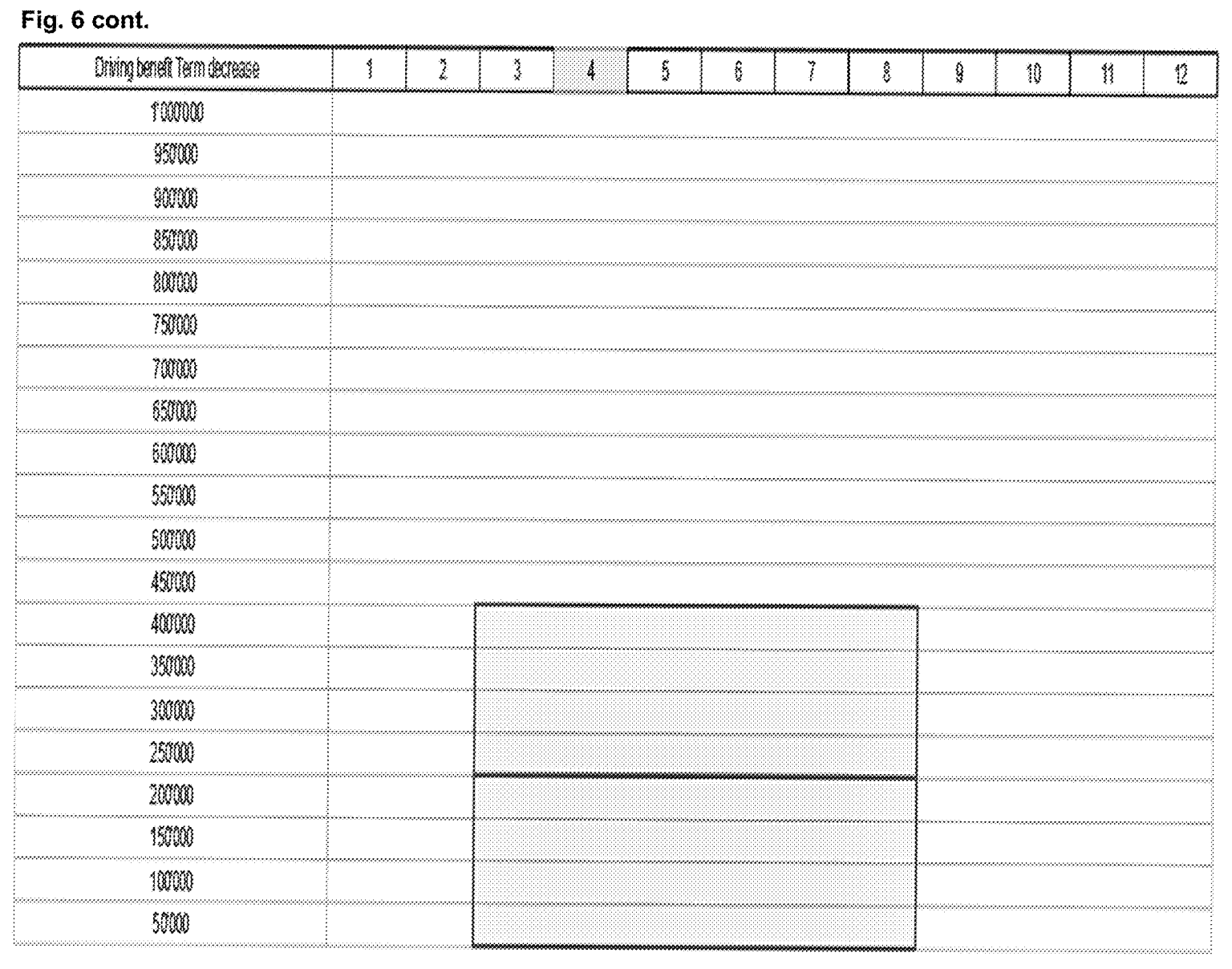
Figure 6:
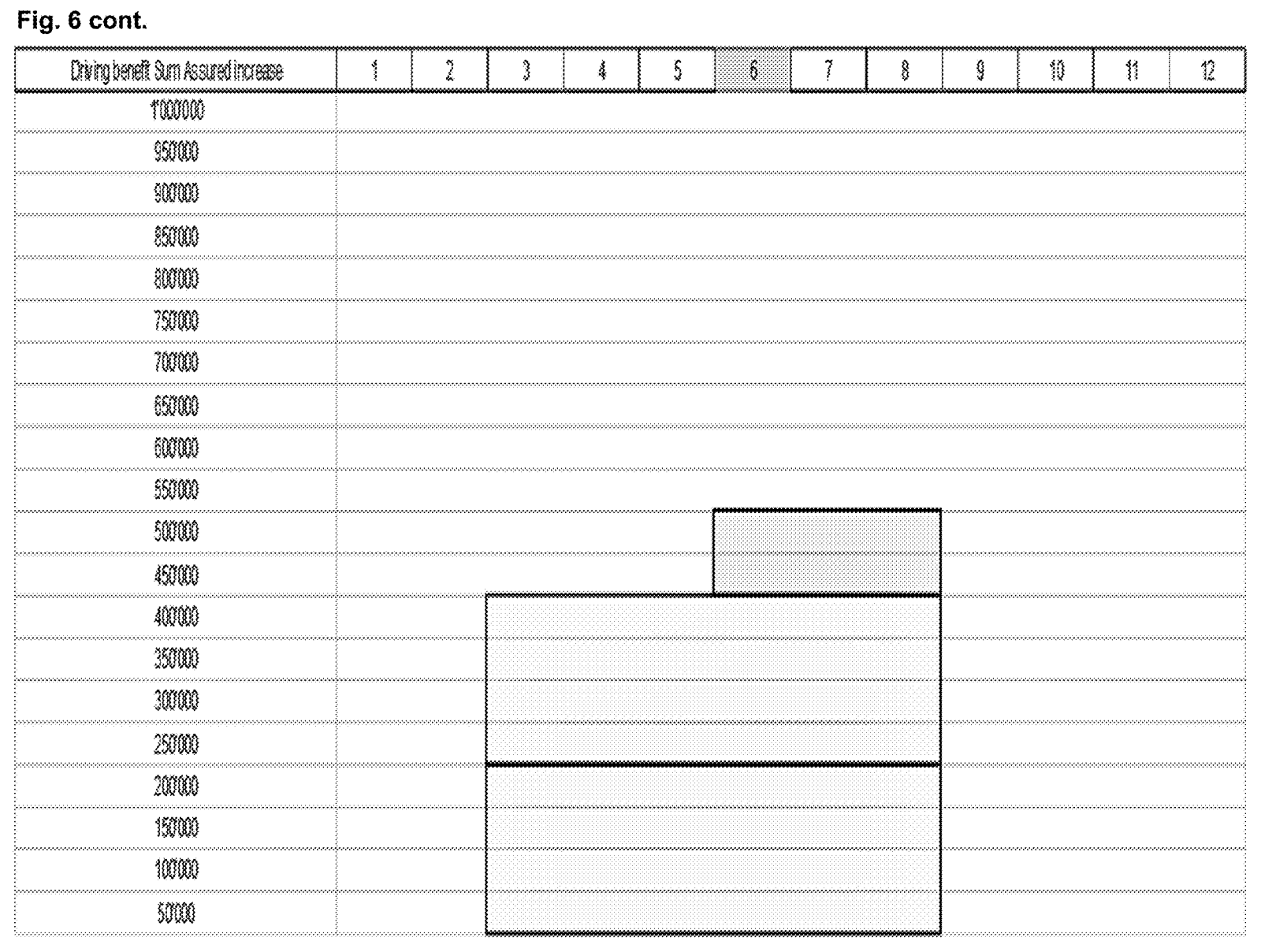
Figure 6:
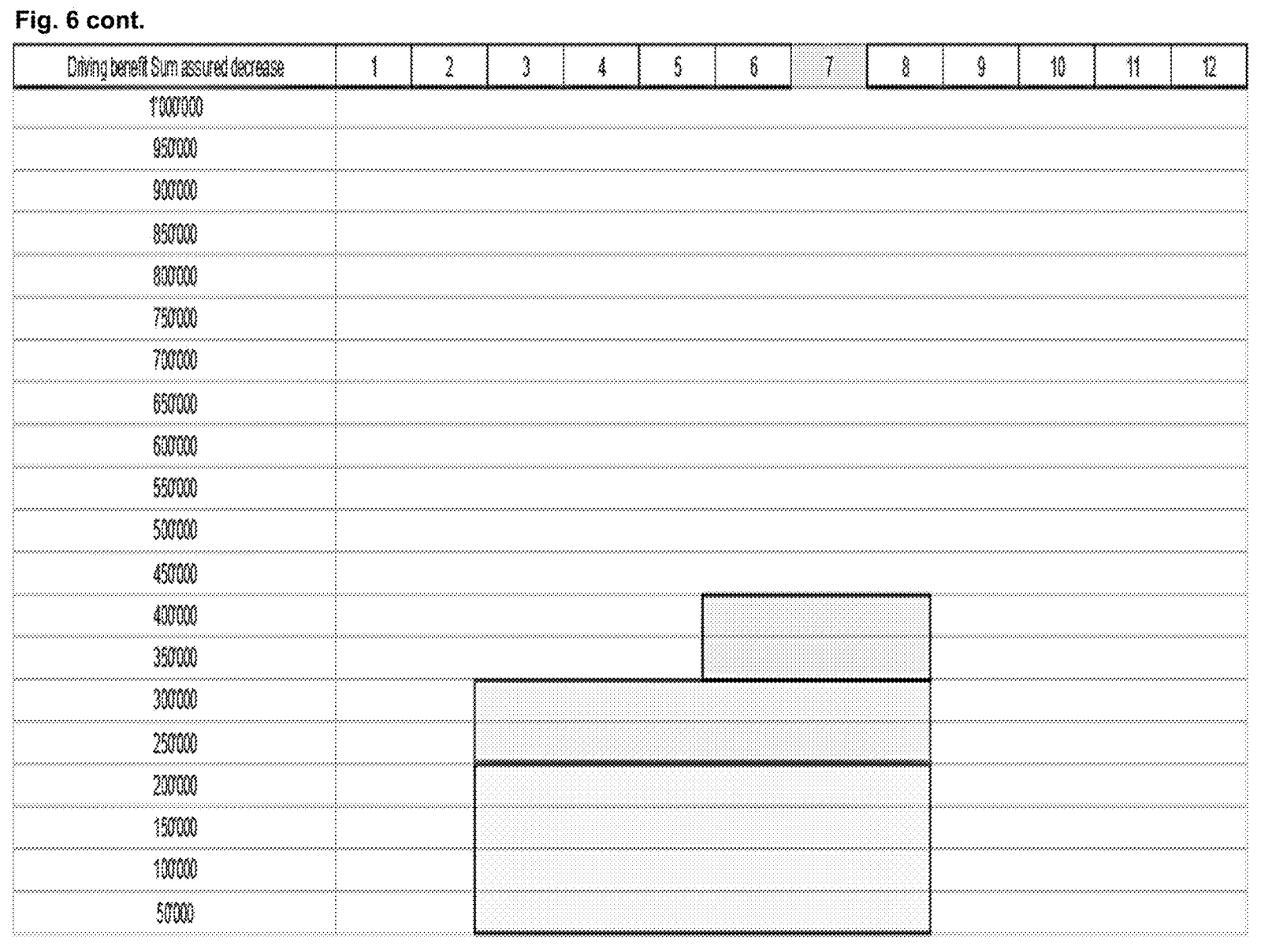
Figure 7:
Figure 7:
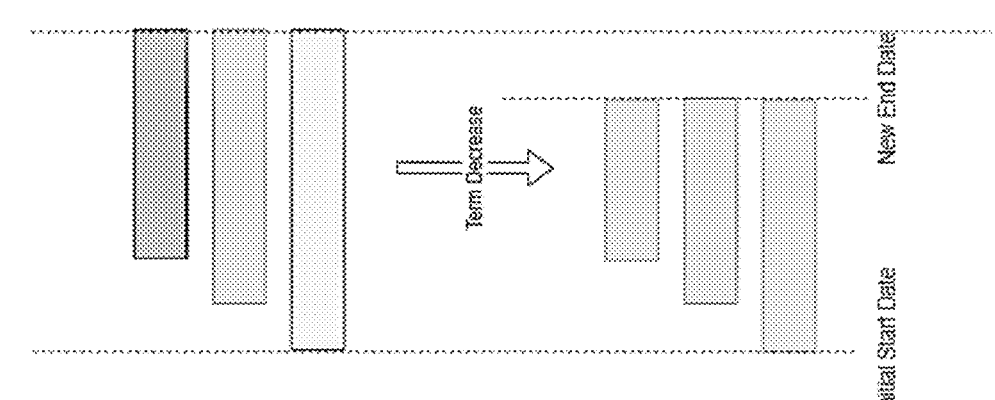
Figure 7:
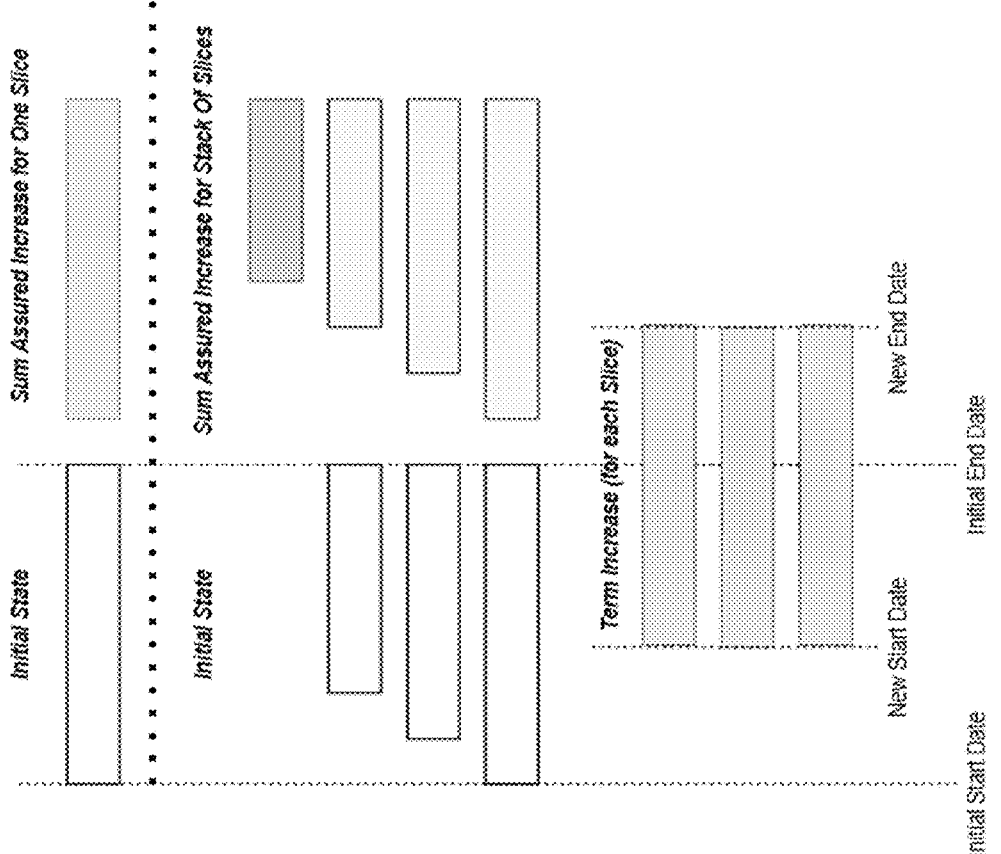
Figure 8:
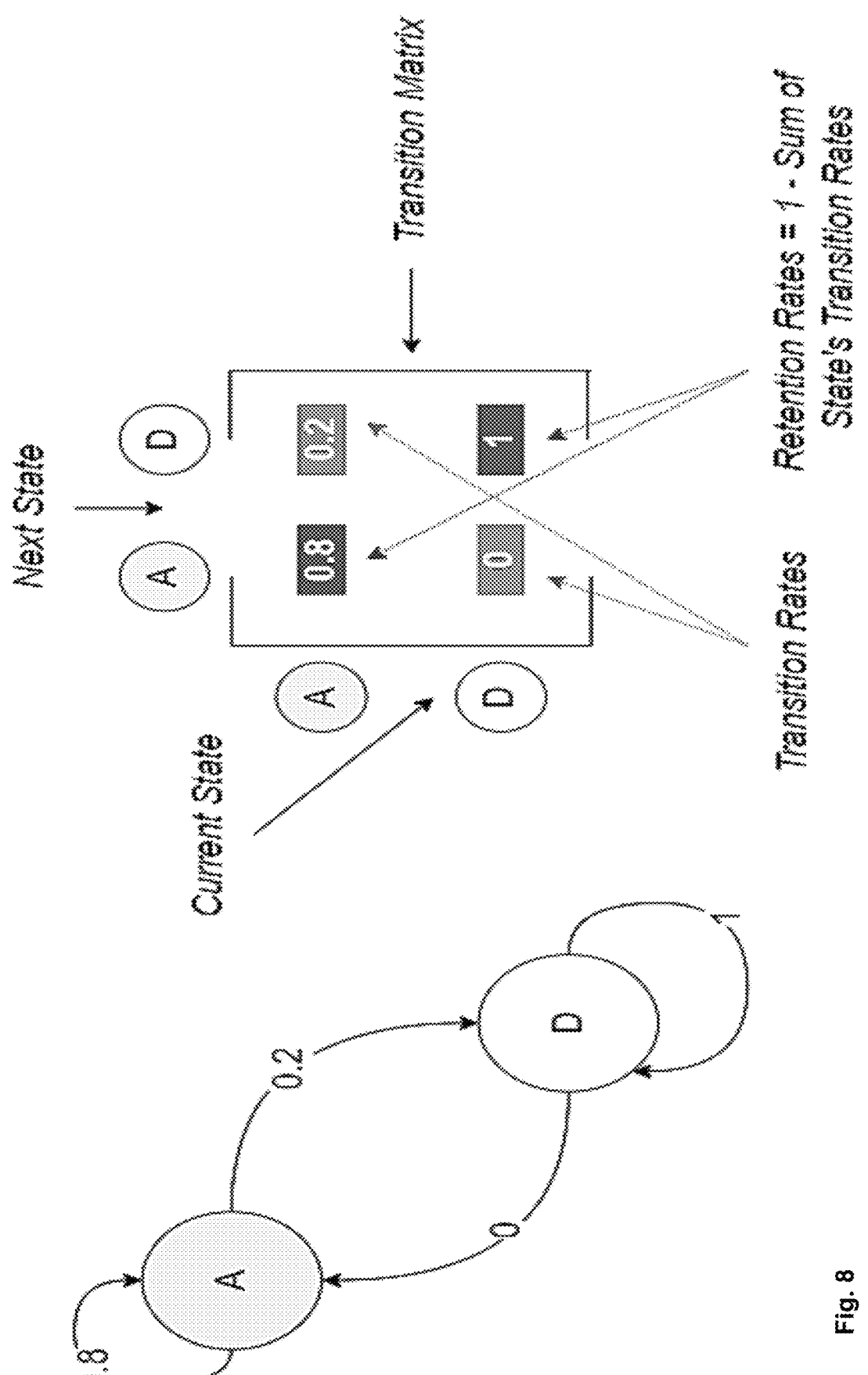
Figure 10:
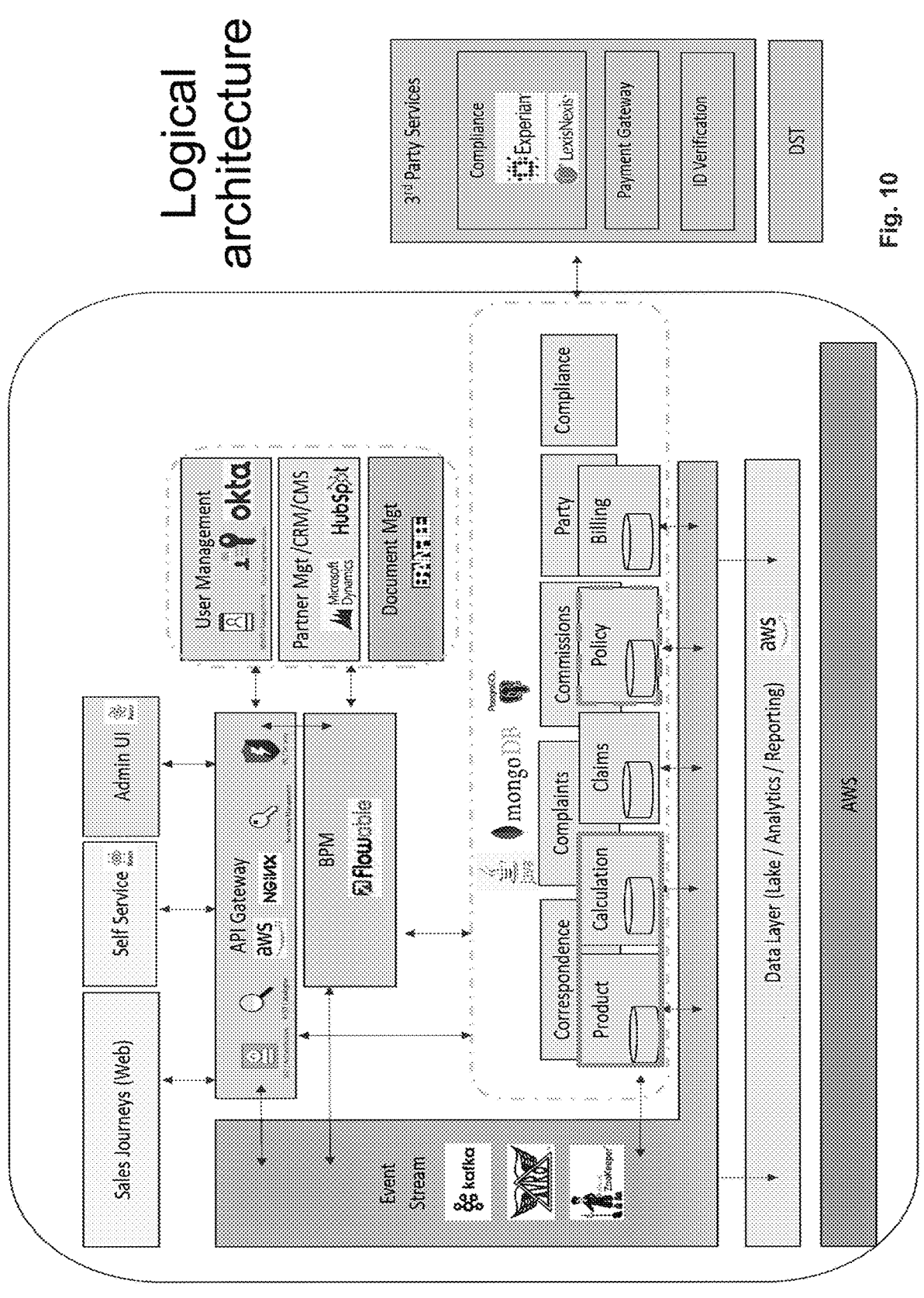
FIG. 10 shows block diagrams illustrating schematically exemplary logical architecture of the inventive digital system/platform and method.
Figure 11:
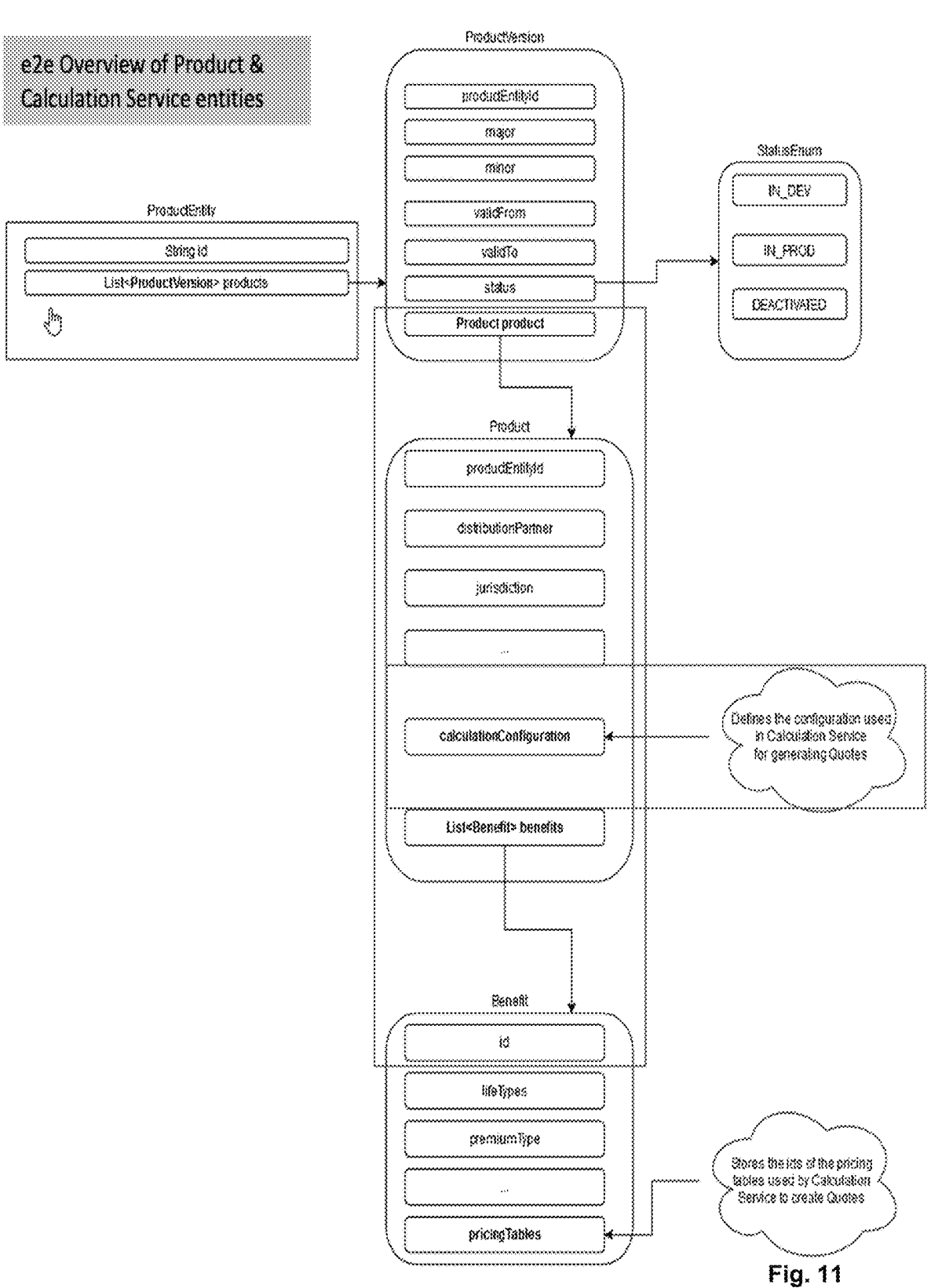
FIG. 11 shows a block diagram illustrating schematically services providable by the digital platform apart from the inventive data processing and forecast: (i) Holding all risk-transfer and pricing parameters, (ii) The calculation engine to automatically generate quotes, premiums, or refunds parameter values for customers, (iii) Flexible configuration of cashflows attached to states and state transitions, which's based on stochastic processes. However, implementing it in practice for risk-transfer purposes is not known as well as its embedding in the context of the proposed wider solution, (iv) Configuration-based calculations—a feature that allows key calculations to be configured rather than hard-coded, e.g. 'sum-date-years', (v) Benefit slices—To allow maximum flexibility as user needs can change, every instance of a policy is made up of multiple benefit slices . . . the Calc service can calculate on a per slice basis, ensuring accurate and auditable automated pricing parameters generation and outputs.
Figure 12:
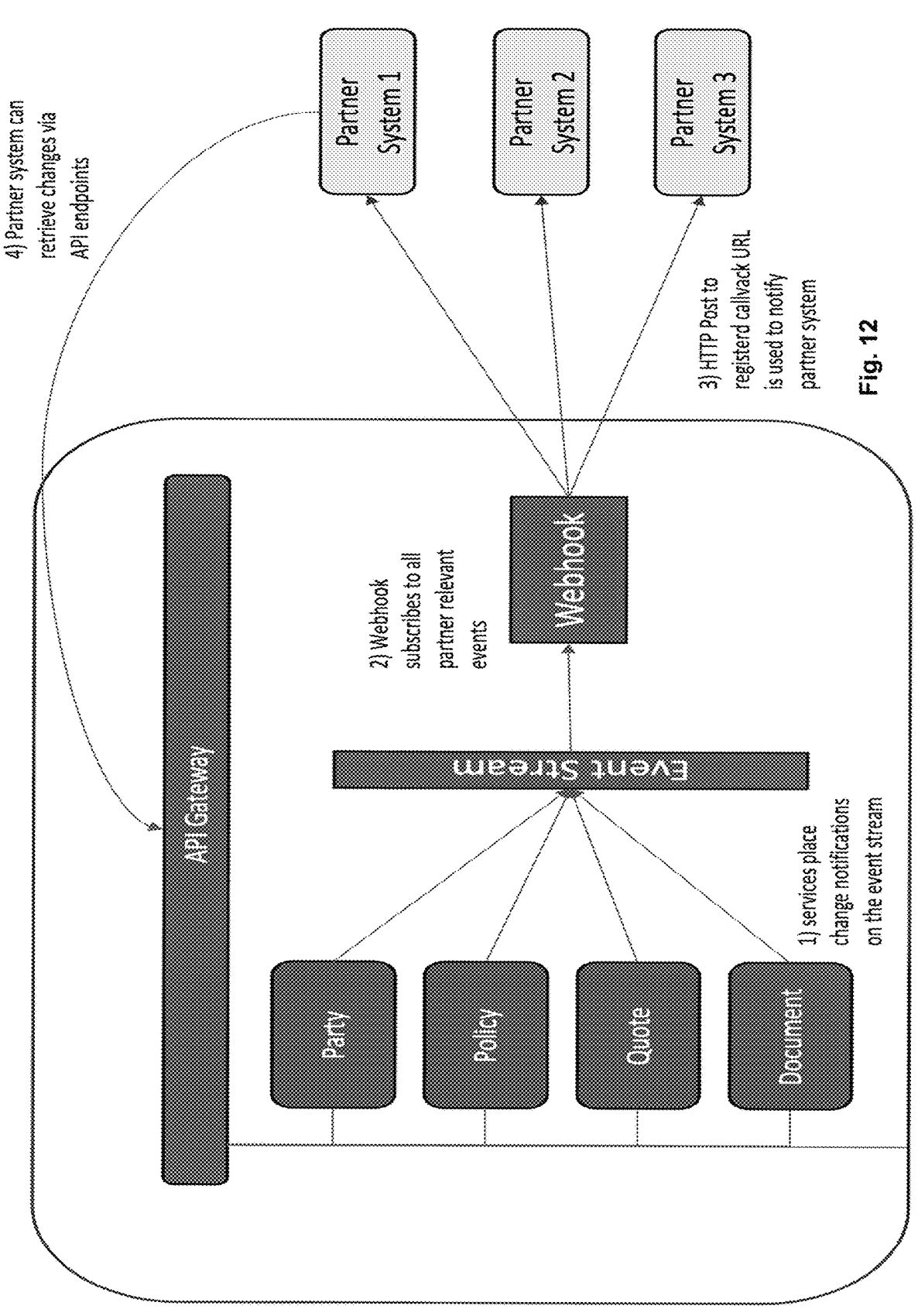
FIG. 12 shows block diagrams illustrating schematically exemplary technical integration structure and pattern for associating 3rd party systems.
Figure 13:
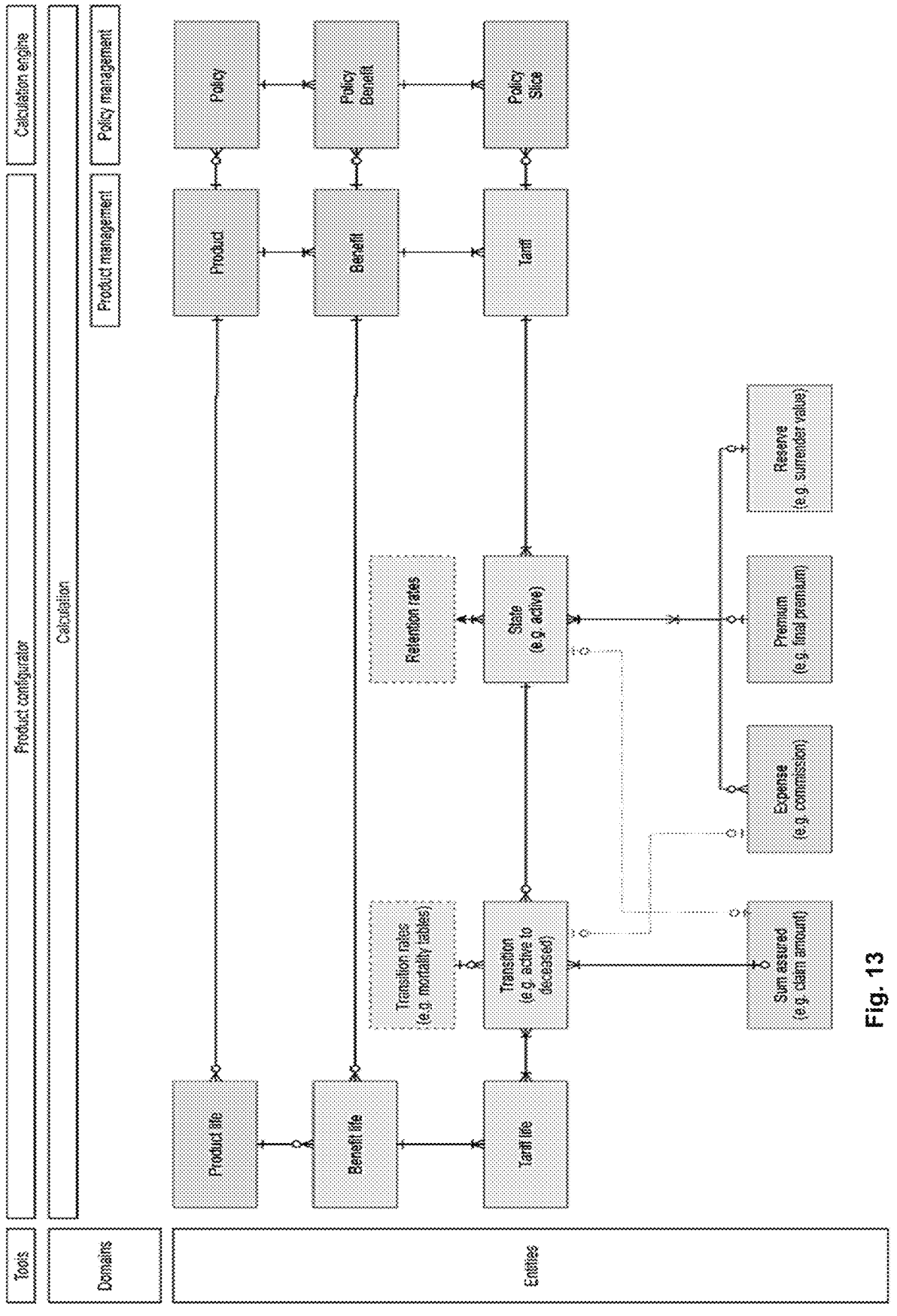
FIG. 13 shows block diagrams illustrating schematically exemplary calculation framework and product framework. The calculation framework comprises (A) the calculation components of (1) Calculation requests are sets of data, which refer to a particular process, product and policy (unless the calculation request is about creating a policy), (2) Calculation rules are sets of rules for calculating values of attributes and attribute properties, and (3) Calculation responses are sets of data, which represent a particular policy; and (B) the calculation entities of (1) Calculation entities are sets of attributes and their attribute properties, which are subject to certain calculation rules. The diagram on the right-hand side shows calculation-relevant entity relationships from different domains. Further the product framework defines the full set of allowable configuration options on product/benefit/tariff level, of which subsets can be used by products: (A) The product entity framework defines the full set of allowable configuration options on product level, of which subsets can be used by products. Example: The initial product framework might allow for premium frequency yearly and monthly and might be enhanced over time to also allow for half-yearly and quarterly. (B) The benefit entity framework defines the full set of allowable configuration options on benefit level, of which subsets can be used by benefits. Example: The initial benefit framework might allow for Cover type "level" and might be enhanced over time to also allow for "decreasing", and (C) The tariff entity framework defines the full set of allowable configuration options on tariff level, of which subsets can be used by tariffs. Example: The initial tariff framework might allow for decreasing frequency yearly for the sum assured decreasing sum assured and might be enhanced over time to also allow for monthly. In general calculation-relevant attributes will be located on tariff level to enhance flexibility to allow for different values per policy slice. Example: Premium rate tables can e.g. be located on tariff level in order to have the ability to always apply the latest premium rate tables per policy slice.
Figure 14A:
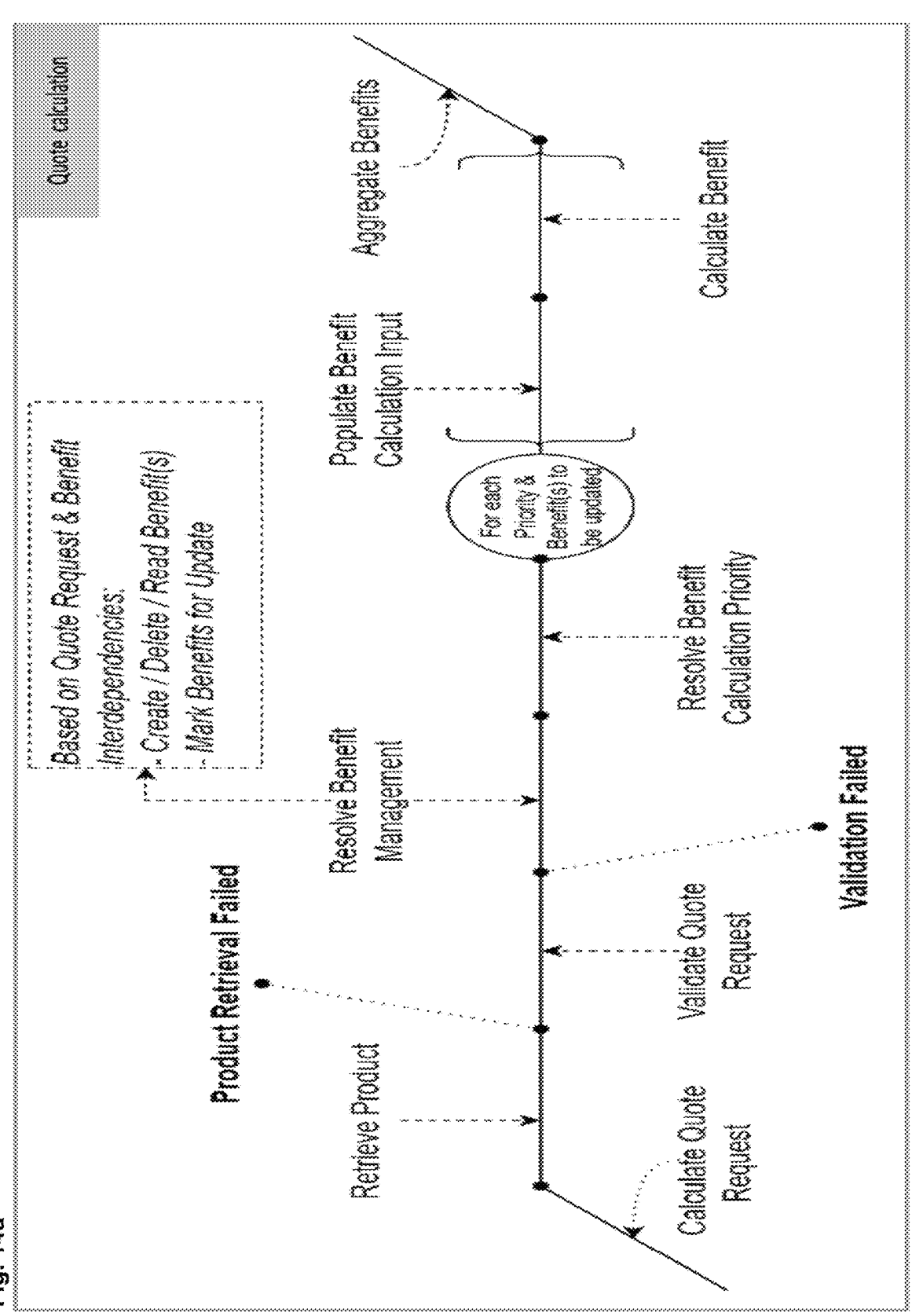
FIGS. 14a to 14c show block diagrams illustrating schematically an exemplary technical design overview. (A) In order to achieve extensibility (ease of change and extension) and decoupling of the configuration of the calculation from its execution: (i) All calculation elements are, or can be expressed, as a function that receives as argument the current quote period and returns a decimal number. See separate pdf for the full list of functions. (ii) The returned 'BigDecimal' allows us to represent any kind of number: double, float, integer . . . . So internally all operations will be done using 'BigDecimal' . . . & all defined as a ConfigurationAttribute will be resolved to a CalculationElement. (iii) Example 'special' functions: Present Value; Sum Assured config; (B) The output is a collection of trees of calculation elements: (i) Any output element can be expressed as the composition of some basic calculation elements and its dependent calculation elements. A calculation element can be seen as the root of a tree of all the dependencies it needs to return a decimal number. The leaf nodes of that tree will be always an INPUT or PARAMETER or any other independent calculation element, (ii) ConfigurationAttribute and relationship with CalculationElement, (iii) All ConfigurationAttribute will define a Function<CoverPeriod, BigDecimal>, (iv) Input: The CalculatorInput interface defines the input for our Calculator. We have opted for an implementation of a Typesafe heterogenous container. (v) Output: The CalculatorOutput interface defines the output of our Calculator—to be flexible enough for any kind of Quote model, the output is a mere dictionary of names associated to Collection<BigDecimal>. (vi) Validation is also a function: CalculationElement Validator: The CalculationElementValidator interface it is also a function, but in this case is a Predicate<CoverPeriod, BigDecimal>. Two implementations are provided, but there is not implementation for the parsing from ConfigurationAttribute to simplify the PoC (the implementation of them could be easily added in the CalculationFactory because Calculation offers them in its API).
Figure 14B:
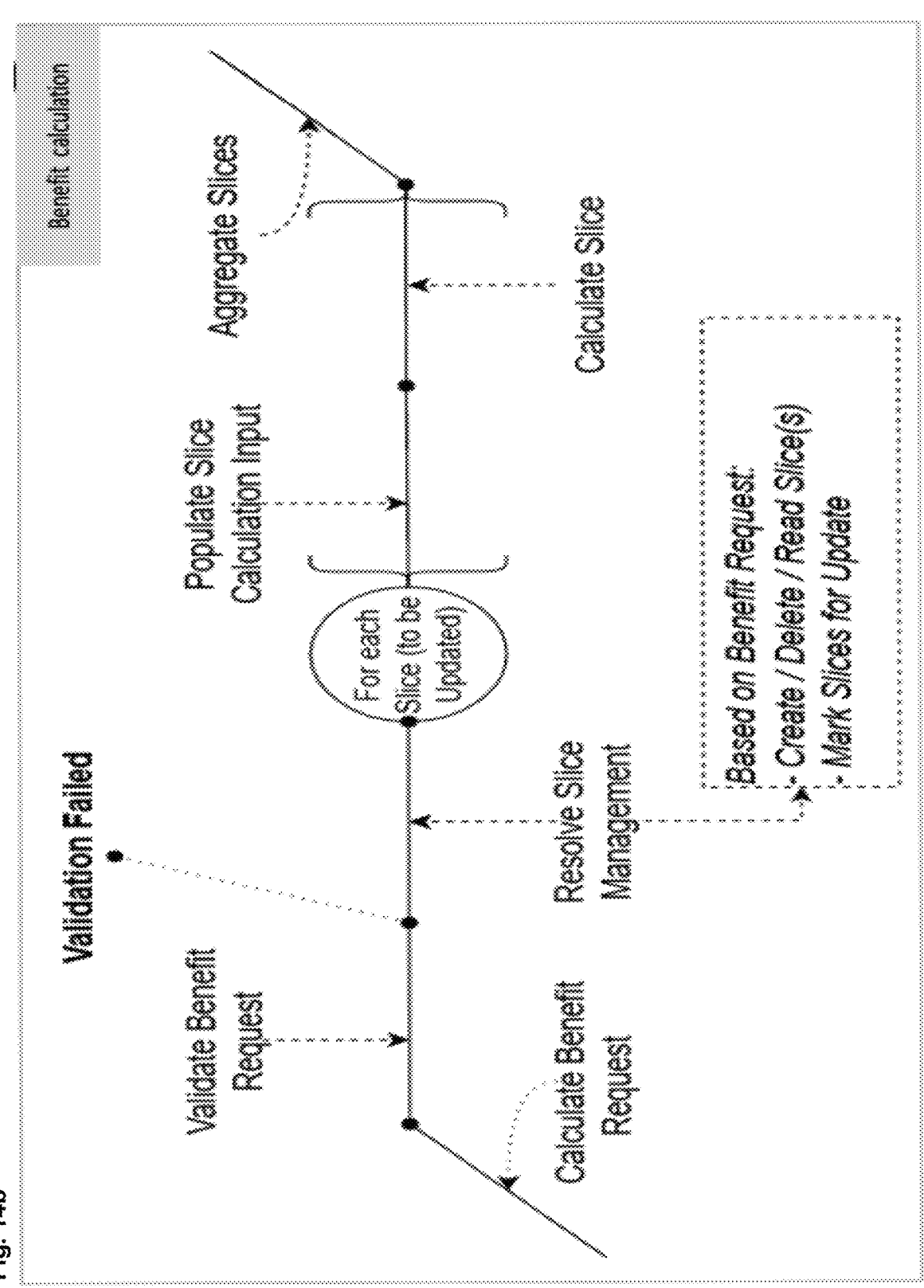
Figure 14C:
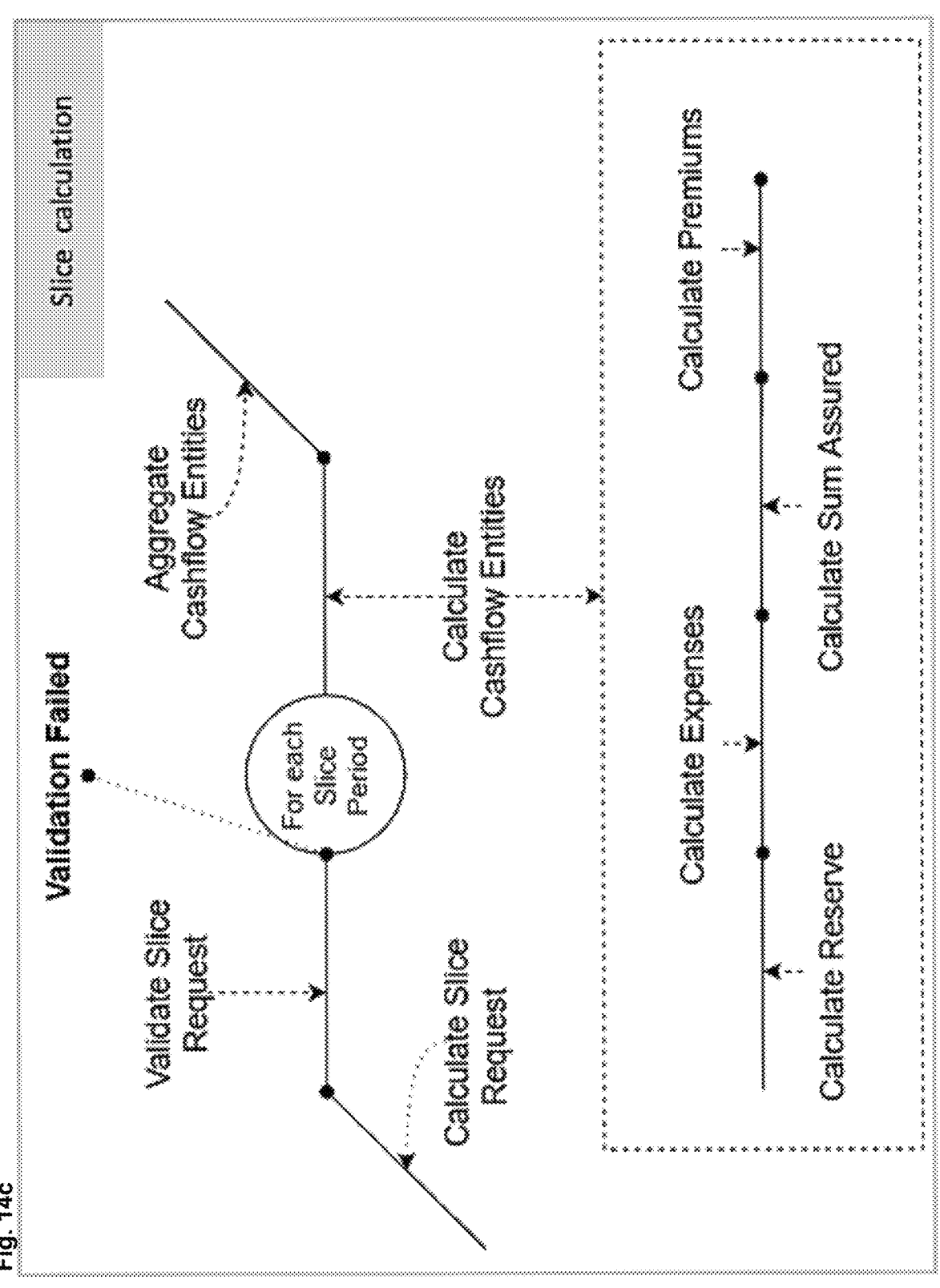
Figure 15:
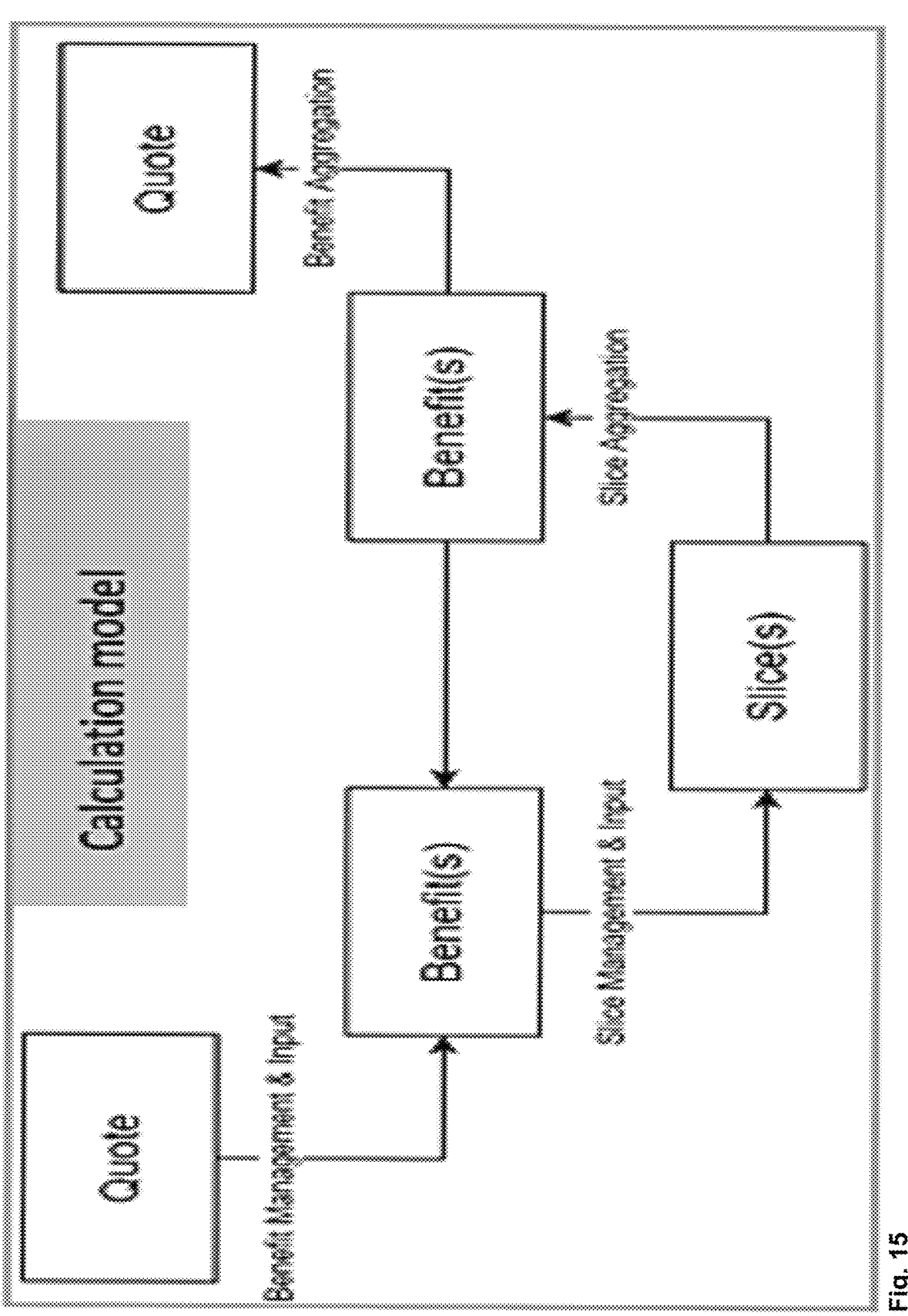
FIG. 15 shows block diagrams illustrating schematically an exemplary calculation process: (i) After all CalculationElement are created from their Configuration. getAllAttributes( ) counterparts, the created Calculation is passed to the Calculator. (ii) Quote calculation' included in above diagram. (iii) Slice management/built quote is also covered in FIG. 13. In addition, the digital system can e.g. comprise (a)

The present invention also technically allows to model cashflows and link them to states or state transitions according to the respective tariff—this allows to generate and/or calculate the cashflows' present value at each discrete point in time. This dynamic is visualized in FIG. 5. FIG. 5 shows a block diagram illustrating schematically an exemplary state-transition-cashflow-modelling structure and/or 3 state-transition-cashflow-modelling structure. FIGS. 6 to 7 show block diagrams illustrating schematically an exemplary overview of how the Markov Chain modelling structure is used, where FIG. 6 shows a simple Markov Chain modelling example, and FIG. 7 a simple Markov Chain calculation for premium cashflow linked to state A. FIG. 7 shows an example for 1000 customers: 1st year, 100*1000=100,000 are received. If in 2nd year 20% are deceased, then the active customers are 800 and 90*800=72,000 are received (instead of 90*1000=90,000).

A mathematical representation of the present value formula for a (sub-)set of modelled cashflows on slice level is as follows:

$$PV_t^S(CF)$$

Present value of a set CF of cashflow amount vectors for state S at calculation period t $$C_t^S$$

Cash flow amount for state S at calculation period t $$v_t^k$$

discount rate at time t for the time from calculation period t to calculation period t+k $$q_t^{S \to T}$$

Transition rate for state S to state T at calculation period t $$C_t^{S \to T}$$

Cashflow amount for state S to state T at calculation period t $$PV_t^S(CF) = \sum_{C \in CF} C_t^S + v_t^1 * \left\{ \sum_T \left[ q_t^{S \to T} * \left( \sum_{C \in CF} C_t^{S \to T} + PV_{t+1}^T(CF) \right) \right] \right\}$$

It is to be noted that the implementation of the calculation engine can e.g. use deterministic transition and interest rates of a discrete process to conduct calculations on policy level. However, the present invention can also be realized using parts of this with stochastic support conducting the simulation processing on portfolio level.

LIST OF REFERENCE SIGNS

1 Electronic, digital finite state system
  10 Data Store
    101 Data Structure
      1011 Modular Digital Transition Functions
      1012 Markov Chain Data Elements
  11 Markov Chain Modelling Structure/Predictor/Simulator
    111 Applied Transition Functions
    112 Applied Interest Parameter Values
    113 Applied Transition Rate Parameter Values
    114 Markov Chain States

115 Output parameter values of the flexible Markov Chain Structure
  12 Simulation engine for automated process/Stochastic Markov data processing
    121 Probability parameter value propagation process
    122 Automated pricing process
    123 Individual mortality-related measuring parameters based on measuring parameters associated with individual 2/2i/2ii
    124 Data structure container/Portfolio
      1241 Data structures capturing loss-cover/risk-transfer parameters of a risk-transfer (Policy/Risk-Transfer)
      12411 Risk-transfer parameters
    125 Digital library
  13 Finite state machine engine
    131 Object-state triggered process
      1311 Sequence of process steps
    132 Digital object
      1320 Persistence storage/digital library
      1321 Set of defined parameters
        13211 Structural parameters
        13212 State parameters
        13213 Digital policy
        132131 Digital policy parameters
        132132 Policy lifecycle states
      1322 Object states
        13221 Initial state of object
        13222 Intermediate states of object
        13223 Final state of object
      1323 Finite state automaton
        13231 Possible states of object
        13232 Transition rules/functions associated with the possible states
        132321 Process steps required for transition
        132322 Condition parameters values required for transition
        132323 Automated transition triggers
        132324 Transition threshold values
        132325 Transition processes
        1323251 Connect processes
        1323252 Forge processes
        1323253 Junction processes
        13233 Initial digital object configuration
    133 Initial object configuration process
  14 Output signal generator
    140 Electronic output signaling
    141 Trigger signal triggering automated underwriting process
      1411 Automated electronic underwriting system
    142 Steering and thresholding signal for automated portfolio management and management adaption
      1421 Automated digital portfolio management system electronically steered by the signaling of the Markov Chain Predictor 11
    143 Triggered automated digital twin adaption steered by output signal generated by digital individual measuring engine 3 based on measured parameter values of wearables/IoT sensory 15
    144 Digital actionable offers
    145 Automatedly generated new digital risk-transfer policies
  15 Wearables/IoT Sensory (input devices and sensors)
    151 Bodily sensory devices
    152 Environmental sensory devices
  16 Data transmission network
  17 Data transfer interface

25 | 26

2 Real-world Risk-exposed Individual
  21 Physical Body Structure
  22 Intangible Body Conditions (Psychological)
  23 Subsystems of the Real-world Individual
    231, 232, 233, . . . , 23*i* Subsystems 1, . . . , i
  24 Environment/Ecosystem of Individual
    241, 242, 243, . . . , 24*i* Subsystems 1, . . . , i
  25 Physical real-world event impacting physically individual by causing a measurable physical damage/body injury or loss to the individual
    251 Illness
    252 Accident
    253 Natural catastrophe (earthquake/storm/hurricane/flood etc.)
3 Digital Individual Measuring Engine
  31 Digital Intelligence Layer
    311 Machine Learning
    312 Neural Network
  32 Body Parameters of the Real-World Individual
  33 Status Parameters of Real-World Individual
    331 Physiological (Body) Status Parameters
    332 Psychological Status Parameters
    333 Habits/Behavioral Status Parameters (Nutrition/Sport etc.)
    333 Environmental Status Parameters (Living Condition etc.)
  34 Data Structures Representing States of Each of the Plurality of Subsystems of the Real-World Individual
  35 Digital Peril and/or Life-risk-event Robot
    351 Simulation
    352 Synchronization
    353 Twin Linking: Sensory/Measuring/Data Acquisition—Wearables/IoT Sensory 15
  36 Digital Ecosystem Replica Layer
    361, 362, 363, . . . , 36*i* Virtual Subsystems of Virtual Representation of Ecosystem
  37 Digital Object/Element Layer of the Individual
    371 Simulation
    372 Synchronization
    373 Linking: Sensory/Measuring/Data Acquisition—Wearables/IoT Sensory 15
  38 Digital Individual Replica Layer
    381, 382, 383, . . . , 38*i* Virtual Subsystems of Real-World Individual

The invention claimed is:

1. An electronic, digital, finite state system for automated processing a digital object by object-state triggered processes, the digital object being capturable or being defined by a set of parameters with definable parameter values comprising at least structural parameters or state parameters associated with the digital object, wherein the digital set of defined parameter values define an initial state of the object, wherein the object is automatedly processed by the digital systems by processing the digital object by a sequence of process steps through which the digital object passes from the initial state to a final state via intermediate states, comprising:

processing circuitry configured to implement a finite state machine engine, wherein the processing of each digital object is based on a finite state automaton comprised in or associated with the digital object, the finite state automaton comprising all possible states and associated transition rules for the digital object, the transition rules at least comprising process steps and condition parameter values for the digital object to be processed from one finite state to a next finite state by the finite state machine engine, wherein a finite state automaton of a digital object is a machine structure that, at a given time is in exactly one state from a finite set of states, wherein the finite set of states comprise a plurality of initial states as a subset of states, wherein when an automaton of a digital object is switched on, it is in any of the initial states, and wherein when input from finite input variables is fed to the automaton meeting certain conditions or constraints, the automaton is leaving its current state and switching to a next state providing a state transition, the automaton reaching its final state when there is no more input from the finite input variables, wherein the transition rules at least comprise automated transition triggers and/or transition threshold values and transition processes comprising at least connect and/or forge and/or junction processes, the automated transition triggers triggering transitions automatically or by default, an automatic transition being triggered when at least one trigger value or threshold value is detected by the digital system to be reached or exceeded, and wherein the possible states and their transition rules for the digital object are configurable within the digital object, and are implicitly processed as part of an initial object configuration process, wherein the initial state of the object at least comprise the possible states and associated transition rules as initial digital object configuration.

2. The electronic, digital, finite state system according to claim 1, wherein the digital set of defined parameter values is given by digital policy parameter values of a policy for a loss-cover related to an exposure of a risk-exposed unit in case of the occurrence of a defined physically impacting event, and wherein the processing states are given by the policy lifecycle states.

3. The electronic, digital, finite state system according to claim 1, wherein the at least one trigger value or threshold value is monitored by the finite state machine engine, wherein if a parameter value associated with the digital object is reached or exceeded, the trigger triggers the state transition.

4. The electronic, digital, finite state system according to claim 2, wherein the processing circuitry is configured to implement a simulation engine comprising a data structure for capturing and/or storing deterministic transition and interest rate parameter values of a state discrete process to conduct data processing per policy, wherein parts of the process are used with stochastic transition and interest rates of a discrete process for conducting simulations on portfolio level, the digital system comprises an interface to the finite state machine engine, wherein for the digital object processing at least interest parameter values and/or transition rate parameter values are user-specific and flexible configurable and/or selectable from an associated digital library, and wherein, within the finite state machine engine, setup parameters and stochastic transition rates are processed and modelled or simulated by the finite state machine engine, and the processing circuitry is configured to implement a slice generator, wherein data processing is sliced by taking place on a slice level and aggregated on a state of benefit and quote level, wherein a slice is created whenever a policy benefit is subject to an unscheduled sum assured increase, and wherein for each newly applied risk-transfer each benefit starts with one slice, each slice being related to the specific risk-transfer version, cover and tariff at that a respective point in time, the slice is generated for.

5. The electronic, digital, finite state system according to claim 4, wherein every finite state of a policy is made up of one or multiple benefit slices.

6. The electronic, digital, finite state system according to claim 4, wherein the calculation engine processes the parameter values on a per slice basis and/or cycle, providing traceable pricing parameter values generation and outputs.

7. The electronic, digital, finite state system according to claim 4, wherein the calculation engine comprises an object or product framework setting a full set of allowable configuration options on product and/or benefit and/or tariff level, of which subsets can be used to configure an individual risk-transfer.

8. The electronic, digital, finite state system according to claim 7, wherein the product framework further comprises a product entity framework with an initial setting of the product framework comprises at least premium frequency yearly and monthly.

9. The electronic, digital, finite state system according to claim 7, wherein the initial setting of the product framework comprises at least premium frequency yearly and monthly, wherein the parameter values are enhanceable over time.

10. The electronic, digital, finite state system according to claim 7, wherein the product framework further comprises a benefit entity framework defining a full set of allowable configuration options on benefit level, of which subsets are useable by benefits.

11. The electronic, digital, finite state system according to claim 7, wherein the product framework further comprises a tariff entity framework defining a full set of allowable configuration options on tariff level, of which subsets are useable by tariffs.

12. The electronic, digital, finite state system according to claim 11, wherein adaptable premium rate tables are located on tariff level in order to have the ability to always apply the latest premium rate tables per policy slice.

13. The electronic, digital, finite state system according to claim 4, wherein data processing or calculation request are enhancing configuration flexibility by atomizing the calculation request into micro calculation requests on quote, benefit, and slice level, which are pre-processed and run in dynamic order.

14. The electronic, digital, finite state system according to claim 13, wherein the calculation engine comprises (i) a pre-processing by automatically creating micro calculation requests on quote, benefit and/or slice level and populate them, and (ii) a core-processing by executing the micro calculation requests, wherein the core calculation always stays the same.

15. The electronic, digital, finite state system according to claim 4, wherein for the data processing by the finite state machine engine, one or more transition functions are configurable via the data interface and/or selectable from the digital library, the transition functions linking at least two states within the finite state machine engine wherein all finite states are linked to an antecedent and a successive state providing the data processing over the whole configurable digital object.

16. The electronic, digital, finite state system according to claim 4, wherein dependences between the rate parameters are applicable within the finite state machine engine.

17. The electronic, digital, finite state system according to claim 4, wherein the finite state machine engine further comprises elements providing flexible configuration for the use of combined model structures for stochastic interest parameter values and/or mortality rate parameter values.

18. The electronic, digital, finite state system according to claim 4, wherein the finite state machine engine data processing of the interest parameters and mortality rate parameters is configured by affine data process structures, wherein the finite state machine engine becoming a traceable model structure during propagation of the parameter values to a defined future time window.

19. The electronic, digital, finite state system according to claim 4, wherein, for the flexible configuration, the digital system comprises adaptable calculation configuration files and/or trees processable by the calculation engine of the digital system.

20. The electronic, digital, finite state system according to claim 4, wherein the finite state machine engine is realized as a continuous time finite state machine engine with a finite or countable infinite state space providing a stochastic process for parameter propagation.

21. The electronic, digital, finite state system according to claim 4, wherein the finite state machine engine is provided only for time-homogeneous finite state processes, where all probability values providing a measure for a life risk within a future time window are generated based on the finite state property.

22. The electronic, digital, finite state system according to claim 4, wherein the digital library is accessible by a plurality of users, wherein the transition functions and/or the interest parameter values and/or the transition rate parameter values of a user are accessible by another user via the data interface and applicable to the other user's finite-state finite state machine engine.

23. The electronic, digital, finite state system according to claim 22, wherein the transition functions and/or the interest parameter values and/or the transition rate parameter values of a first user are only accessible upon request of a second user and/or upon approval or enablement by the first user to the second user.

24. The electronic, digital, finite state system according to claim 1, wherein the processing circuitry is configured to implement a Markov Chain modelling structure and/or predictor for mortality probability parameter value propagation and for dynamic and automated impact-cover pricing by processing a plurality of individual mortality-related measuring parameters associated with a portfolio of loss-covers of risk-exposed individuals, wherein each loss-cover held associated with the portfolio is set by risk-transfer parameters of a loss-covers as risk-transfer policy defining parameter-based the individual risk-transfer, a combination of a Markov Chain modelling structure with configurable elements are applied at least comprising states and/or state transitions and/or cash-flows specific to the risk-transfer, and wherein a stochastic Markov data processing is applied to the Markov chain structure over a sequence of possible events in which the probability value of each event depends only on the state attained in the previous event, the processing circuitry is configured to implement a simulation engine comprising a data structure for capturing and/or storing deterministic transition and interest rate parameter values of a state discrete process to conduct data processing per policy, wherein parts of the process are used with stochastic transition and interest rates of a discrete process for conducting simulations on portfolio level, the digital system comprises an interface to the Markov chain structure, wherein for the stochastic Markov data processing, interest parameter values and transition rate parameter values are user-specific and flexible configurable and/or user-specific selectable from an associated digital library, and wherein within the stochastic Markov data processing setup and stochastic transition rates, these underlying rates are processed and modelled by the finite-state Markov chain structure, and for the data processing by the finite-state Markov chain structure, one or more transition functions are configurable via the data interface and/or selectable from the digital library, the transition functions linking at least two states within the Markov chain structure wherein all states of the Markov chain structure are linked to an antecedent and a successive state providing the data processing over the whole configurable Markov chain structure.

25. The electronic, digital, finite state system according to claim 24, wherein the digital system and platform comprises the signal generator automatically generating an electronic signaling based on the output parameter values of the electronic Markov Chain structure, the electronic signally being transferred to an automated underwriting system of the digital system triggering at least one automated underwriting process by assigning automatically at least one risk-exposed individual processed by the Markov Chain structure to a risk-transfer associated with a future occurrence of physical event physically impacting the at least one risk-exposed individual.

26. The electronic, digital, finite state system according to claim 24, wherein the digital system and platform comprises the signal generator automatically generating an electronic signaling based on the output parameter values of the electronic Markov Chain structure, the electronic signally being transferred to an automated digital portfolio management system of the digital system automatically adapting threshold values for at least one risk-exposed individual processed by the Markov Chain structure, the at least one risk-exposed individual being automatically assigned to the portfolio, where an occurring loss and/or damage and/or injury of an individual associated with a future occurrence of physical event physically impacting the at least one risk-exposed individual is automatically covered by the system.

27. The electronic, digital, finite state system according to claim 24, wherein dependences between the flexible configurable transition and interest rate parameters are applicable within the finite-state Markov Chain Structure.

28. The electronic, digital, finite state system according to claim 24, wherein the finite-state Markov Chain Structure further comprises elements providing flexible configuration for the use of combined model structures for stochastic interest parameter values and/or mortality rate parameter values.

29. The electronic, digital, finite state system according to claim 24, wherein the stochastic Markov data processing of the interest parameters and mortality rate parameters is configured by affine data process structures, wherein the finite-state Markov Chain Structure becoming a traceable model structure during propagation of the parameter values to a defined future time window.

30. The electronic, digital, finite state system according to claim 24, wherein, for the flexible configuration, the digital system comprises adaptable calculation configuration files and/or trees processable by the simulation engine of the digital system.

31. The electronic, digital, finite state system according to claim 24, wherein the Markov chain structure is realized as a continuous time Markov Chain Structure with a finite or countable infinite state space providing a stochastic process for parameter propagation.

32. The electronic, digital, finite state system according to claim 24, wherein the Markov chain structure is provided only for time-homogeneous Markov chain processes, where all probability values providing a measure for a life risk within a future time window are generated based on the Markov property.

33. A digital method implemented by processing circuitry of an electronic, digital, finite state system for automated processing a digital object by object-state triggered processes, the digital object being capturable or being defined by a set of parameters with definable parameter values comprising at least structural parameters or state parameters associated with the digital object, wherein the digital set of defined parameter values define an initial state of the object, wherein the object is automatedly processed by the digital systems by processing the digital object by a sequence of process steps through which the digital object passes from the initial state to a final state via intermediate states, comprising:

processing of each digital object by a finite state machine engine of the digital system based on a finite state automaton comprised in or associated with the digital object, the finite state automaton comprising all possible states and associated transition rules for the digital object, the transition rules at least comprising process steps and condition parameter values for the digital object to be processed from one finite state to a next finite state by the finite state machine engine, wherein a finite state automaton of a digital object is a machine structure that, at a given time is in exactly one state from a finite set of states, wherein the finite set of states comprise a plurality of initial states as a subset of states, wherein when an automaton of a digital object is switched on, it is in any of the initial state, and wherein when input from finite input variables is fed to the automaton meeting certain conditions or constraints, the automaton is leaving its current state and switching to a next state providing a state transition, the automaton reaching its final state when there is no more input from the finite input variables, wherein the transition rules at least comprise automated transition triggers and/or transition threshold values and transition processes comprising at least connect and/or forge and/or junction processes, the automated transition triggers triggering transitions automatically or by default, an automatic transition being triggered when at least one trigger value or threshold value is detected by the digital system to be reached or exceeded, and configuring the possible states and their transition rules for the digital object within the digital object, and processing the possible states and their transition rules implicitly as part of an initial object configuration process, wherein the initial state and/or set-up of the object at least comprise the possible states and associated transition rules as initial digital object configuration.

* * * * *